United States Patent [19]
Matsuda et al.

[11] Patent Number: 4,853,725
[45] Date of Patent: Aug. 1, 1989

[54] CONNECTOR FOR A CAMERA

[75] Inventors: Mutsuhide Matsuda; Masao Aoyagi, both of Kanagawa; Hiroshi Furukawa; Masami Shimizu, both of Tokyo, all of Japan

[73] Assignee: Canon Kabushiki Kaisha, Tokyo, Japan

[21] Appl. No.: 271,363

[22] Filed: Nov. 14, 1988

Related U.S. Application Data

[63] Continuation of Ser. No. 136,732, Dec. 22, 1987, abandoned.

[30] Foreign Application Priority Data

| Dec. 27, 1986 | [JP] | Japan | 61-312678 |
| Dec. 27, 1986 | [JP] | Japan | 61-312679 |
| Dec. 27, 1986 | [JP] | Japan | 61-312681 |
| Jan. 6, 1987 | [JP] | Japan | 62-705 |
| Jan. 12, 1987 | [JP] | Japan | 62-4516 |

[51] Int. Cl.⁴ .......................................... G03B 17/12
[52] U.S. Cl. .................................................. 354/286
[58] Field of Search ........................................ 354/286

[56] References Cited

U.S. PATENT DOCUMENTS

4,739,356 4/1988 Ogura et al. ............... 354/286

FOREIGN PATENT DOCUMENTS

60-120440 8/1985 Japan.

OTHER PUBLICATIONS

"PHOT ARGUS", Nov. 1977(10 pp.), Rolleiflex SLX article, Nov. 1977, (No translation provided).

*Primary Examiner*—Michael L. Gellner
*Attorney, Agent, or Firm*—Fitzpatrick, Cella, Harper & Scinto

[57] ABSTRACT

A connector structure for a camera having bayonet mounts on the side of a camera body and on the side of an accessory, the camera body and the accessory being interconnected by rotating the mounts round relative to each other and being disconnected by reversely rotating the mounts. A group of contact pins is arranged at a camera body side connector to be slidingly brought into contact with a group of contact pins arranged at an accessory side connector by the rotational mounting action. The group of contact pins at the accessory side connector being in paired contact with the pins of the group of contact pins at the camera body side connector to permit communication between the camera body and the accessory upon completion of the mounting action. A first conductive member is arranged to be electrically connected in parallel with a first contact pin among the group of contact pins arranged at one of the connectors. The first contact pin coming into sliding contact with only one of the group of contact pins arranged at another of the connectors while the two mounts are rotated relative to each other. A second conductive member is arranged at the other of the connectors to abut on the first conductive member upon completion of the mounting action to be electrically connected in parallel to a second contact pin which is arranged at the other of the connectors and abuts the first contact pin upon completion of the mounting action.

49 Claims, 26 Drawing Sheets

F I G. 30
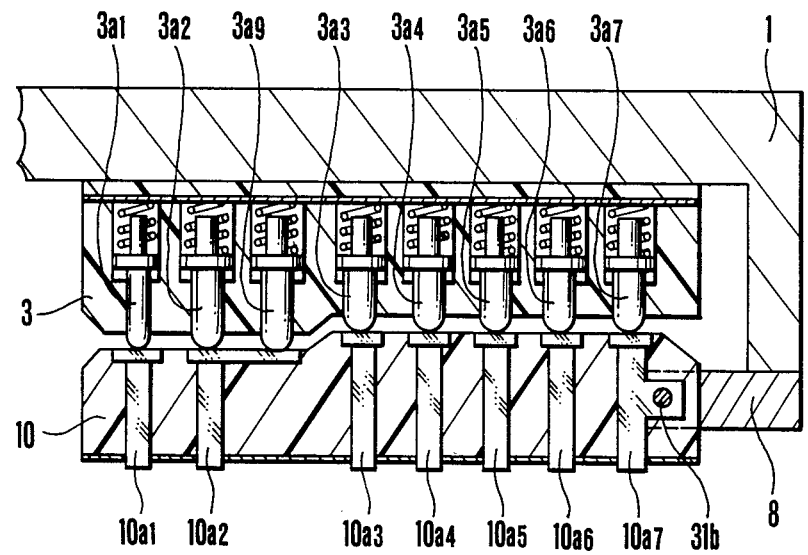

CONNECTOR FOR A CAMERA

This application is a continuation of application Ser. No. 136,732 filed 12/22/87, now abandoned.

BACKGROUND OF THE INVENTION:

1. Field of the Invention:

This invention relates to a connector for a camera and more particularly to a connector for connecting a camera body with the electric circuit of an accessory such as an interchangeable lens.

2. Description of the Related Art:

Interchangeable lens cameras of the having bayonet mounts arranged to mount and dismount the lens on the camera body by clockwise and counterclockwise relative movement have recently been equipped with electric circuits in both the camera body and the lens to exchange various information of automatic exposure control, automatic focusing, etc. Hence, it has become popular to have many connector pins provided close to the mounts for the purpose of signal exchange.

Referring to FIGS. 8 to 11 of the accompanying drawings, a bayonet mount 1 on the side of a camera A (see FIG. 4) is disposed on the front of a camera body 4. Lock pin 2, which is provided for fixing the lens when the lens is mounted, and a contact seat 3 which forms a connector on the camera side are also disposed on the front of the camera body 4. A plurality of contact pins $3a1$ to $3a7$ (seven in this case) are arranged to have their tips thrust out to equal extents from the front face of the contact seat 3 by the urging forces of contact springs $3b1$ to $3b7$. The contact pins $3a1$ to $3a7$ are connected by means of a flexible printed circuit board 5 to an electric device 6 (FIG. 4) disposed on the side of the the camera body. Meanwhile, an interchangeable lens B carries a photo taking lens group 7 (FIG. 4). To the rear end face of the lens B are secured a bayonet mount 8 of the lens, a lock slot 9, which is arranged to engage the lock pin 2 of the camera body, and a contact seat 10 which forms a connector on the side of the lens. The contact seat 10 is provided with a plurality (seven in this case) of contact pins $10a1$ to $10a7$ which are secured to the seat 10 in such a way as to have their rear ends arranged to be flush with each other. These contact pins $10a1$ to $10a7$ are connected to an electric device 12 of the lens via a flexible printed circuit board 11 (FIG. 4).

The bayonet mount 1 on the side of the camera body has three claws $1a1$, $1a2$ and $1a3$ which are disposed on the inner side of the mount. The bayonet mount 8 on the side of the lens also been three claws $8a1$, $8a2$ and $8a3$ arranged thereon to engage the above stated claws $1a1$ to $1a3$ respectively. The lock pin 2 on the side of the camera body engages the lock slot 9 to hold the lens in a mounted state after completion of mounting the lens on the camera.

With the interchangeable lens B mounted on the camera A, the mount faces of the bayonet mounts are in a state of overlapping each other. Then, the contact pins $3a$ of the camera body are pressed into contact with the contact pins $10a$ of the lens by the forces of the contact springs $3b$ with an adequate degree of contact pressure. The contact pins $3a1$ to $3a7$ are thus electrically connected to the contact pins $10a1$ to $10a7$. This enables the electric device 6 on the side of the camera body and the electric device 12 on the side of the lens to exchange electrical signals.

The electrical connection which results from the mounting action on the interchangeable lens B is attained in a manner as shown in FIG. 8. The contact seat 10 on the side of the lens B moves in the direction of arrow C as the lens B is rotated for mounting. Then, the contact pins on the side of the camera body are pushed by a slanting edge face $10b$ of the contact seat 10 of the lens one after another in the order of pins $3a7$ to $3a1$ thus sliding alternately over the surface of the contact seat 10 of the lens and over the contact pins $10a1$ to $10a7$ of the lens while the contact springs are compressed one after another in the order of springs $3b7$ to $3b1$. These contact pins $3a1$ to $3a7$ of the camera body are thus eventually brought into pressed contact with the contact pins $10a1$ to $10a7$ respectively on one and the same plane as shown in FIG. 9 when the lens is completely mounted on the camera body.

With the conventional connector arranged as shown in FIGS. 8 and 9, the contact pin $10a1$ of the lens B first comes into sliding contact with the contact pin $3a7$ of the camera body when the lens B is rotated on the camera body. The mounting operation comes to an end when the contact pin $10a1$ of the lens has come into sliding contact which the contact pin $3a1$ after its contact with the pins $3a7$ $3a2$. Following the contact pin $10a1$ during the mounting process, other contact pins of the lens also come into sliding contact with the contact pins of the camera body one after another. More specifically, the pin $10a2$ comes into contact with the pins $3a7$ to $3a3$, ---, the pin $10a6$ with the pins $3a7$ and $3a6$ and the pin $10a7$ with only the pin $3a7$.

The contact pins $10a1$ to $10a7$ are fixed and have their surfaces arranged either to be flush with the connecting surface of the contact seat 10 of the lens or to be recessed. Therefore, they tend to have dust or some foreign matter stuck to them. The foreign matter sticking to the contact pins $10a1$ to $10a7$ of the lens is removed and the surfaces of the pins are cleaned by the sliding contact with takes place with the contact pins $3a7$ to $3a1$ of the camera body in mounting the lens on the camera body. In this instance, while the surfaces of the contact pins $10a1$ to $10a6$ can be cleaned with the contact pins $3a7$ to $3a1$ sliding from one end (left- or right-hand side end as viewed on FIGS. 8 and 9) over to the other end at least once, the contact pin $10a7$ cannot be completely cleaned, because the corresponding contact pin $3a7$ disposed on the side of the camera body slides only to a middle part from the right-hand side end of the pin $10a7$ (as viewed on FIGS. 8 and 9). Therefore, foreign matter sticking to the contact pin $10a7$ tends to remain unremoved. Besides, every time the interchangeable lens B is mounted on the camera A, the foreign matter sticking to the contact pins $10a1$ to $10a6$ of the lens is carried toward the last contact pin $10a7$ by the contact pins $3a7$ to $3a2$ of the camera body to be accumulated on the contact pin $10a7$ of the lens. The accumulated foreign matter then tends to cause inadequate contact. Normal operations of the camera and the lens are hardly assured under such a condition.

SUMMARY OF THE INVENTION

It is an object of this invention to provide a connector for a camera which assures improved reliability of contact between a camera body and an accessory device arranged to be electrically connected via their contact pins when the latter is mounted on the former by turning them round relative to each other, so that any faulty operation due to inadequate contact can be prevented.

The above and other object and features of this invention will become apparent from the following detailed description of embodiments thereof taken in conjunction with the accompanying drawings.

BRIEF DESCRIPTION OF THE DRAWINGS

FIG. 1 is a sectional view showing the connector under the process of mounting an accessory on a camera body.

FIG. 2 is a sectional view showing the same connector in a state obtained after completion of the mounting process.

FIG. 3 is an electrical circuit diagram showing in outline the electrical connection obtained with an interchangeable lens and a camera coupled with each other.

FIG. 4 is a longitudinal section taken across a middle part of a camera showing the camera in a state of having the lens mounted thereon.

FIG. 5 is a sectional view showing the connector under the process of mounting an accessory on a camera body.

FIG. 6 is a sectional view showing the connector in a state obtained after completion of the same mounting process.

FIG. 7 is an electrical circuit diagram showing in outline the electrical connection obtained with an interchangeable lens and a camera coupled with each other.

FIG. 8 is a sectional view showing the connector under process of mounting an accessory on a camera body.

FIG. 9 is a sectional view showing the connector in a state obtained after completion of the same mounting process.

FIG. 10 is a front view showing a bayonet mount provided on the side of the camera body.

FIG. 11 is a front view showing a bayonet mount provided on the side of an interchangeable lens.

FIG. 12 is a sectional view showing the connector under the process of mounting an accessory on a camera body.

FIG. 13 is a sectional view showing the connector in a state obtained after completion of the mounting process.

FIG. 14 is a front view of a bayonet mount disposed on the side of a camera.

FIG. 15 is a front view of a bayonet mount disposed on the side of an interchangeable lens.

FIG. 16 is an electrical circuit diagram showing in outline the electrical connection obtained with the interchangeable lens and the camera coupled with each other.

FIG. 17 is a sectional view showing the connector under the process of mounting an accessory on a camera body.

FIG. 18 is a sectional view showing the same connector in a state obtained after completion of the mounting process.

FIG. 19 is a front view of a bayonet mount disposed on the side of the camera.

FIG. 20 is a front view of another bayonet mount which is disposed on the side of an interchangeable lens.

FIG. 21 is an electrical circuit diagram showing the outline the electrical connection made with the lens and the camera coupled with each other.

FIG. 22 is an electrical circuit diagram showing in outline the electrical connection made with an interchangeable lens and a camera coupled with each other.

FIG. 23 is a sectional view showing the connector under the process of mounting an accessory (or the lens) on a camera body.

FIG. 24 is a sectional view showing the same connector in a state obtained after completion of the mounting process.

FIG. 25 is a circuit diagram showing in outline the electrical connection made with an interchangeable lens and a camera coupled with each other.

FIG. 26 is a sectional view showing the connector under the process of mounting an accessory (or the lens) on a camera body.

FIG. 27 is a sectional view showing the same connector as in a state obtained after completion of the mounting process.

FIGS. 29 and 30 show relations obtained between the electrical contact pins of the camera body and those of the accessory or lens in mounting the latter on the former.

Figure 1:
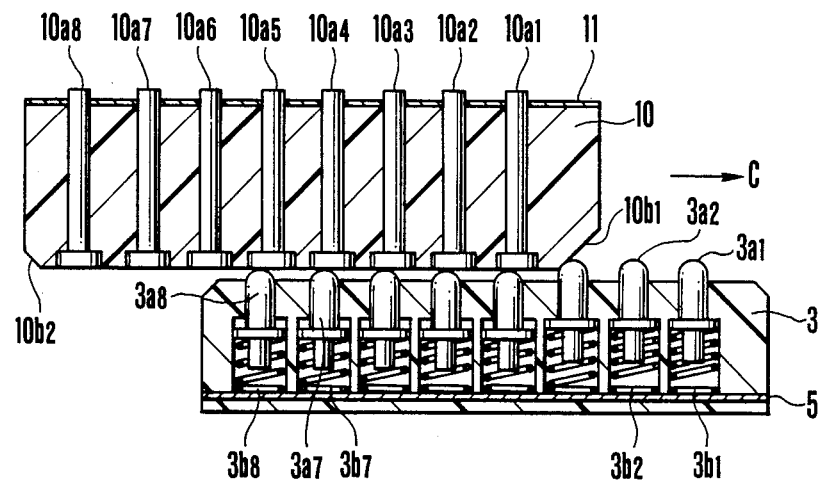
FIGS. 1 to 4 show a connector arranged as a first embodiment of this invention.

DETAILED DESCRIPTION OF THE PREFERRED EMBODIMENTS:

A first embodiment of this invention is arranged as described below with reference to FIGS. 1 to 4:

A camera body A has a bayonet mount 1 which is arranged on the front of a camera body 4. A contact seat 3 forms a connector around the bayonet mount 1 on the side of the camera body. Contact pins $3a1$ to $3a8$ are arranged and evenly spaced on the seat 3 in the circumferential direction of the mount. Contact springs $3b1$ and $3b8$ are arranged to urge these pins to protrude from the front surface (or upper face as viewed on FIG. 1 and 2) of the contact seat 3. The contact pins $3a1$ to 3a8 are connected via a flexible printed circuit board 5 to a power source battery which is not shown but is connected to an electric device 6 disposed within the camera body and the power supply pattern of the flexible printed circuit board 5.

An interchangeable lens B is provided with a bayonet mount 8 for mounting the lens B on the camera body by rotating it around the body. A contact seat 10 is arranged to form a connector on the side of the lens at the bayonet mount 8. Contact pins 10a1 to 10a8 are secured to the contact seat 10 and are evenly spaced in the circumferential direction of the mount 8.

The contact pins 3a7 and 3a8 of the camera body are electrically connected to the contact pins 10a7 and 10a8 respectively of the lens as will be further described later on with reference to the electrical circuit diagram of FIG. 3. The contact pins 10a1 and 10a8 on the contact seat 10 of the lens have their outer ends formed into slanting faces 10b1 and 10b2 respectively. In mounting the interchangeable lens B on the camera A (or camera body) by rotating the lens relative to the camera body, the contact pins 3a1 to 3a8 are pushed by the slanting face 10b1 against the urging forces of the contact springs 3b1 to 3b8. The contact pins 10a1 to 10a8 of the lens are connected via a flexible printed circuit board 11 to an electric device 12 disposed on the lens units.

The contact pins 3a1 to 3a7 of the contact seat 3 disposed on the side of the camera A are in the same diametric positions as those of the contact pins of the lens B. When the lens B is rotated for mounting it on the camera body, the contact pin 3a8 which performs a cleaning function first comes into contact with the contact pins 10a of the lens and is arranged to move in the direction of an optical axis. This contact pin 3a8 is also urged by a spring 3b8 to protrude in the same direction as other contact pins of the camera body.

Figure 2:
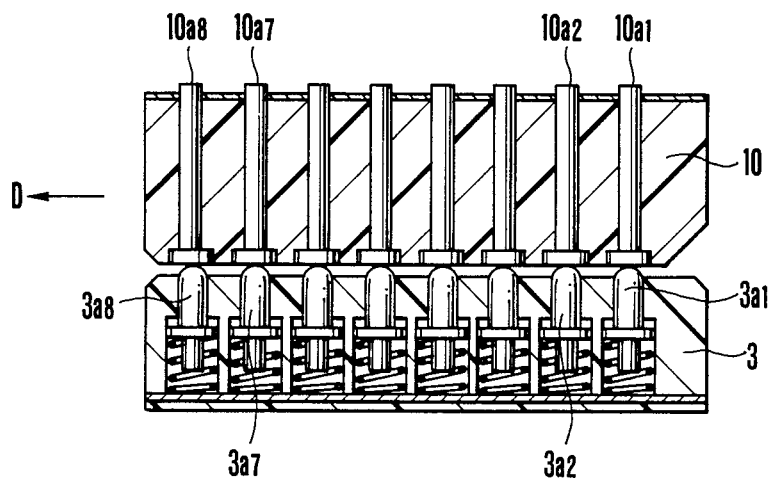

With the embodiment arranged as described above, the contact pin 3a8 comes to slide over all the contact pins 10a1 to 10a8 of the lens. The pin 3a8 comes into contact with the contact pin 10a8 of the lens when the lens B is completely mounted on the camera body as shown in FIG. 2. Therefore, even if some foreign matter such as dust or the like is sticking to the surfaces of the contact pins 10a1 to 10a7 of the lens, the foreign matter is wiped off by the sliding contact of the contact pin 3a8. The contact pin 10a7 which is in the farthest end position and has not been adequately cleaned in the case of the conventional arrangement can now be adequately cleaned by the arrangement of this embodiment. The embodiment thus ensures adequate electrical contact of the contact pins 10a1 to 10a7 of the lens with the contact pins of the camera body after completion of mounting.

While foreign matter such as dust is thus removed from the contact parts of the contact pins 10a1 to 10a7 of the lens by the contact pin 3a8 of the camera body, the contact pins 10a1 to 10a7 of the lens are opposed respectively to the contact pins 3a1 to 3a7 of the camera body when the bayonet mount 8 of the lens is completely coupled with the bayonet mount of the camera body. Under this condition, the probability of faulty operations due to inadequate contact resulting from increased resistance caused by dust or the like can be greatly lessened.

Further, as mentioned in the foregoing, the contact pins 3a7 and the 3a8 of the camera body are electrically connected to the contact pins 10a7 and 10a8 of the lens respectively. This arrangement gives continuity at two contact points, so that the probability of inadequate contact also can be lessened.

Figure 3:
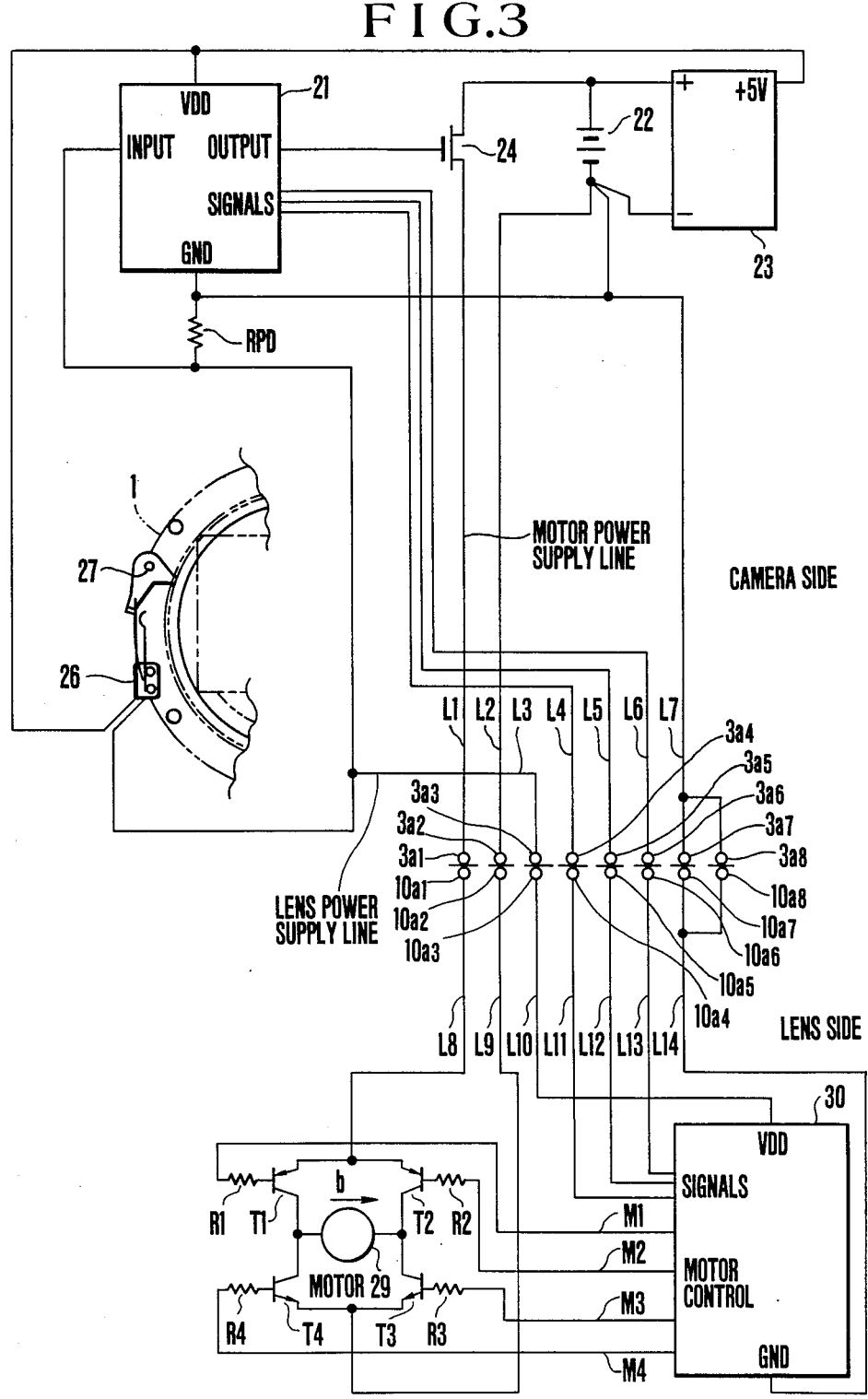
Figure 4:
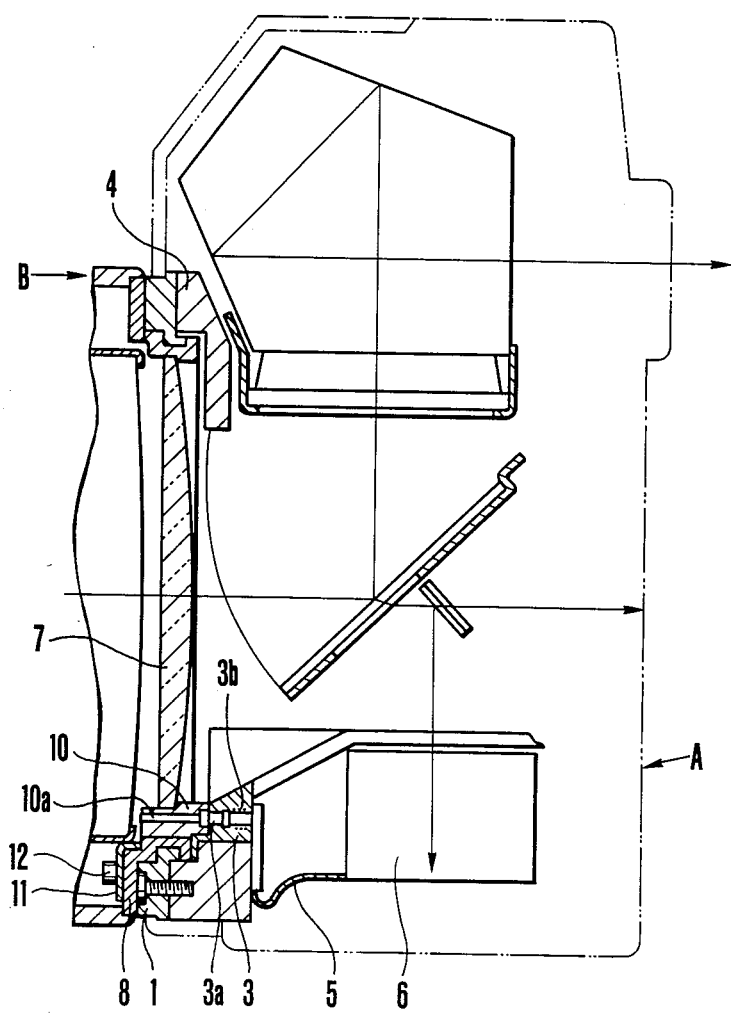

FIG. 3 shows a circuit diagram of the electrical connection obtained by the first embodiment between the electric device 6 disposed on the camera body and the electric device 12 disposed on the lens. Referring to FIG. 3, an electronic circuit 21 is provided within the camera body. A power source 22 is replaceably provided also within the camera body. A constant voltage producing circuit 23 is arranged to receive electric energy from the power source 22 and to serve as a power source for the electronic circuit 21 and also for the electronic circuit disposed within the lens. An analog switch 24 is arranged to turn on and off a power supply to a motor which is disposed within the lens as will be further described later. A bayonet mount 1 is disposed on the camera body. A lens mounting detection switch 26 is disposed on the input signal line of the electronic circuit 21 and is located close to the bayonet mount 1 of the camera body. A lens mounting responsive member 27 is arranged to operate the switch 26 in response to a lens mounting operation. The member 27 is a swingable member pivotally attached to the reverse side of the bayonet mount 1 of the camera body. The member 27 has two arm parts on both sides of the pivotal point thereof. One arm is arranged to engage a part of the bayonet mount 8 on the lens side and to be driven thereby. The other arm of the member 27 is arranged to push one of the switch pieces of the lens mounting detection switch 26.

The lens mounting detection switch 26 has two switch pieces which are arranged to be away from each other when the lens is not mounted on the camera body and to be brought into contact with each other to allow the output terminal of the constant voltage producing circuit 23 to be connected to the input terminal of the electronic circuit 21 when the lens is mounted.

As stated in the foregoing, a wiring connecting contact seat 3 is disposed on a lower part of the inner circumferential side of the bayonet mount 1 of the camera body. The contact seat 3 is provided with many contact pins 3a1 to 3a7 which are arranged to abut on contact pins 10a1 to 10a7 disposed on the side of the lens. Each of the contact pins 3a1 to 3a7 is discretely connected to one of wiring lines L1 to L7 provided on a printed circuit board attached to the camera body. Meanwhile, another contact pin 3a8 which is arranged to perform a cleaning function is connected in parallel to the line L7 among the lines L1 to L7. The contact pin 10a8 is likewise connected in parallel to a line L14.

The wiring line L1 connected to the contact pin 3a1 is a motor power supply line provided for supplying electrical energy from the power source 22 to a motor which is disposed within the lens and is arranged in a manner as will be described later. An analog switch 24 is provided for the motor power supply line.

The line L3 which is connected to the contact pin 3a3 is connected to the lens mounting detection switch 26 and the input terminal of the electronic circuit 21. The line L2 which is connected to the contact pin 3a2 is a power ground line and is connected to the negative plate of the power source 22. The line L7 which is connected to the contact in 3a7 is arranged to be connected to the grounding conductor of the electronic circuit disposed on the lens side and is connected to the negative plate of the power source 22 as well as the grounding terminal of the electronic circuit 21 disposed on the side of the camera body.

The lines L4 to L6 connected to the contact pins 3a4 to 3a6 serve as signal lines which are provided for signal exchange between the electronic circuit 21 on the side of the camera body and the electronic circuit on the lens side. These lines L4 to L6 are respectively connected to signal terminals of the electric circuit 21.

The interchangeable lens which is arranged according to this invention to be mounted and dismounted on and from the camera body which is arranged as described above comprises a focusing motor 29; a static switch which is arranged to change the direction of power supply to the motor 29 from one direction over to the other; and an electronic circuit 30 which is arranged to exchange various signals with the electronic circuit 21 on the camera body. The lens further comprises a bayonet mount 8 which is arranged to be removably coupled with the corresponding bayonet mount 1 disposed on the side of the camera body; and a contact seat 10 which is disposed on a lower part of the inner circumferential side of the bayonet mount 8 and is arranged to be opposed to the contact seat 3 which is disposed on the camera body side.

The contact seat 10 of the interchangeable lens is provided with seven contact pins 10a1 to 10a7, which are arranged to be brought into contact with the contact pins 3a1 to 3a7 which are aligned on the side of the camera body. The contact pins 10a1 to 10a are respectively connected to wiring lines L8 to L14. The lines L8 and L9 are connected to the motor 29 via the static switch which will be described later. Compared with other lines L10 to L14, these lines l8 and L9 are power lines arranged to allow larger current flows. The line L8 serves as a motor power supply line and the line 9 as a power ground line for grounding one of the poles of the motor 29.

The line L10 which is connected to the contact pin 10a serves as a power supply line for supplying an electric current to the electronic circuit 30 disposed on the lens side. The line L10 is thus connected to the power supply terminal of the circuit 30 and is also arranged to be connected via the contact pins 10a3 and 3a3 to the line L3 disposed on the side of the camera body.

The line L14 is connected to the grounding terminal of the electronic circuit 30 and is arranged to be connected to the line L7 of the camera body via the contact pins 10a7 and 3a7. The line L14 thus serves as a signal ground line for the circuit 30 on the lens side.

The lines L11 to L13 are connected to the signal terminals of the electronic circuit 30 and are connected to the contact pins 10a4 to 10a6 respectively. The lines L11 to L13 are further arranged to be connected to the lines L4 to L6 of the camera body via the contact pins 10a4 to 10a6 of the lens and the contact pins 3a4 to 3a6 of the camera body respectively. These lines L11 to L13 thus serve as signal lines for the interchangeable lens.

The static switch device which is arranged to change the direction of power supply to the motor 29 from one direction over to the other includes two pairs of transistors T1 to T4, each of the pairs consisting of one NPN transistor and one PNP transistor. One pair of the transistors are connected to one pole of the motor while the other pair are connected to the other pole of the motor 29. The emitter of each of the PNP transistors T1 and T2 is connected to the wiring line L8 disposed on the side of the interchangeable lens. The line L8 is arranged to be connected via the contact pin 10a1 of the contact seat 10 to the line L1 disposed on the side of the camera body. In other words, both the lines L8 and L1 are arranged to serve jointly as a power supply line for supplying electrical energy to the motor 29.

One of the poles of the motor 29 is connected to the collector of each of the PNP transistor T1 and the NPN transistor T4 which are paired while the other is connected to the collector of each of the PNP transistor T2 and the NPN transistor T3 which are also paired. The emitter of each of the NPN transistors T3 and T4 of these transistor pairs is connected to the line L9. The line L9 serves as a power ground line disposed on the side of the interchangeable lens and is arranged to connect the negative pole of the motor 29 via the contact pin 10a2 to the contact pin 3a2 of the camera body and also to the negative plate of the power source 22 via the line L2 disposed on the side of the camera body.

The electronic circuit 30 is provided with control terminals for controlling the transistors T1 to T4 of the static switch device. Signal lines M1 to M4 are arranged to connect these control terminals to the bases of the transistors T1 to T4 respectively. Reference symbols R1 to R4 denote resistors respectively.

A feature of the interchangeable lens of this embodiment resides in that: Each of the grounding line and the grounding connection terminal of the motor 29 and those of the electronic circuit is discretely arranged. The component parts of the lens shown in the drawings operate as described below:

(i) When the lens is not mounted on the camera body:

With the lens not mounted, the contact seat 10 of the lens is away from the contact seat 3 of the camera body. Therefore, the contact pins 3a1 to 3a7 are not in contact with the contact pins 10a1 to 10a7. The lens mounting detection switch 26 which is disposed at the bayonet mount 1 of the camera body has the two switch pieces thereof in a parted state The input terminal of the electronic circuit 21 is, therefore, in connection with the negative pole of the power source 22 via a reducing resistor RPD. The input terminal is thus in a state of having a low level voltage which is close to the ground voltage applied thereto. As a result, from the output terminal of the circuit 21 is produced a high level voltage which turns off (opens) the analog switch 24. Therefore, the contact pin 3a1 is disconnected from the power source 22 under this condition.

(ii) When the lens is mounted on the camera body:

In mounting the lens on the camera body, the bayonet mount 8 of the lens is rotated clockwise relative to the bayonet mount 1 of the camera body as shown in the drawing. Therefore, the lens mounting responsive member 27 is rotated counterclockwise on the pivotal point thereof by the bayonet mount 8 of the lens. Then, one of the arm part of the member 27 pushes one of the switch pieces of the lens mounting detection switch 26 to bring the two switch pieces into contact with each other. The switch 26 is thus turned on. The switch thus connects the 5 V output terminal of the constant voltage producing circuit 23 to the input terminal of the electronic circuit 21. Therefore, a high level (5 V) input voltage is applied to the input terminal of the circuit 21. As a result, the output voltage level of the output terminal of the circuit 21 changes from a high level to a low level. This causes the analog switch 24 to turn on to connect the positive pole of the power source 22 to the contact pin 3a1.

With the lens completely mounted on the camera body, the contact pins 3a1 to 3a7 come into contact with the contact pins 10a1 to 10a7 of the lens. Therefore, the wiring lines L1 to L7 of the camera body are connected to the lines L8 to L14 of the lens via the contact pins 3a1 to 3a7 and 10a1 to 10a7. As a result, wiring connection is completed as shown in FIG. 3. In FIG. 3, the lens mounting detection switch 26 is shown in an open state. However, upon completion of the lens mounting operation, the switch 26 is in a closed state.

After the lens is mounted on the camera body, the electronic circuit 21 which is disposed on the camera body sends control signals relative to the actions of the camera (mainly a focusing action) to the electronic circuit 30 of the lens via the lines L4 to L6 and lines L11 to L13. Then, at the same time, the circuit 30 sends signals relative to the motor 29 via the same lines to the circuit 21 of the camera body. For example, when the circuit 30 makes the signal level of the line M3 high and, at the same time, that of the line M1 low in response to the control signal from the circuit 21, the transistors T1 and T3 become conductive. This allows a current flow in the direction of arrow b to the motor 29 via the L8 and the transistor T1 to cause the motor 29 to rotate forward. Then, this current flows back to the negative pole of the power source 22 via the line L9, contact pins 10a2 and 3a2 and the line L2.

Further, when a signal for reverse rotation of the motor 29 is sent from the circuit 21 to the circuit 30 via the lines L4 to L6, the circuit 30 produces a low level signal to the line M2 and a high level signal to the line M4 (while the signal level of the line M1 is high and that of the line M3 is low). As a result, the transistors T2 and T4 become conductive to allow a current to flow to the motor 29 in the direction reverse to the direction of arrow b. This causes the motor 29 to rotate in reverse.

Figure 5:
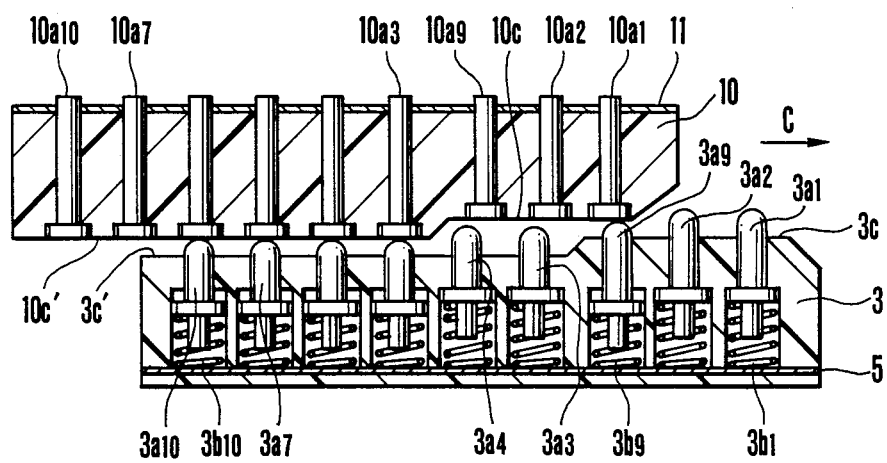
FIGS. 5 to 7 show a connector arranged as a second embodiment of this invention.
Figure 6:
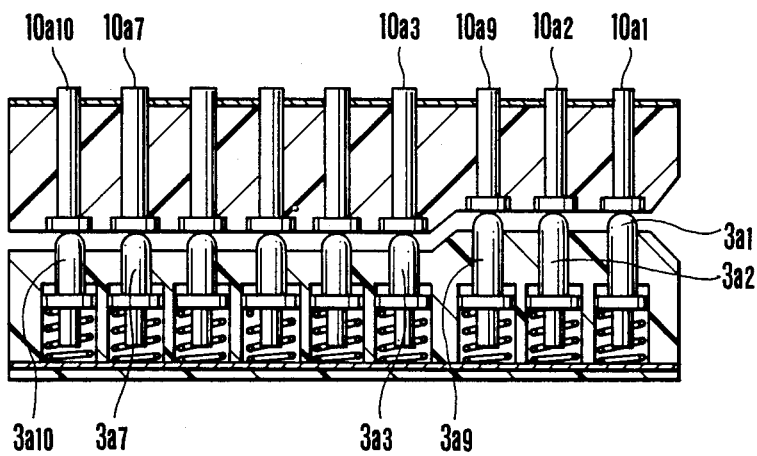
Figure 7:
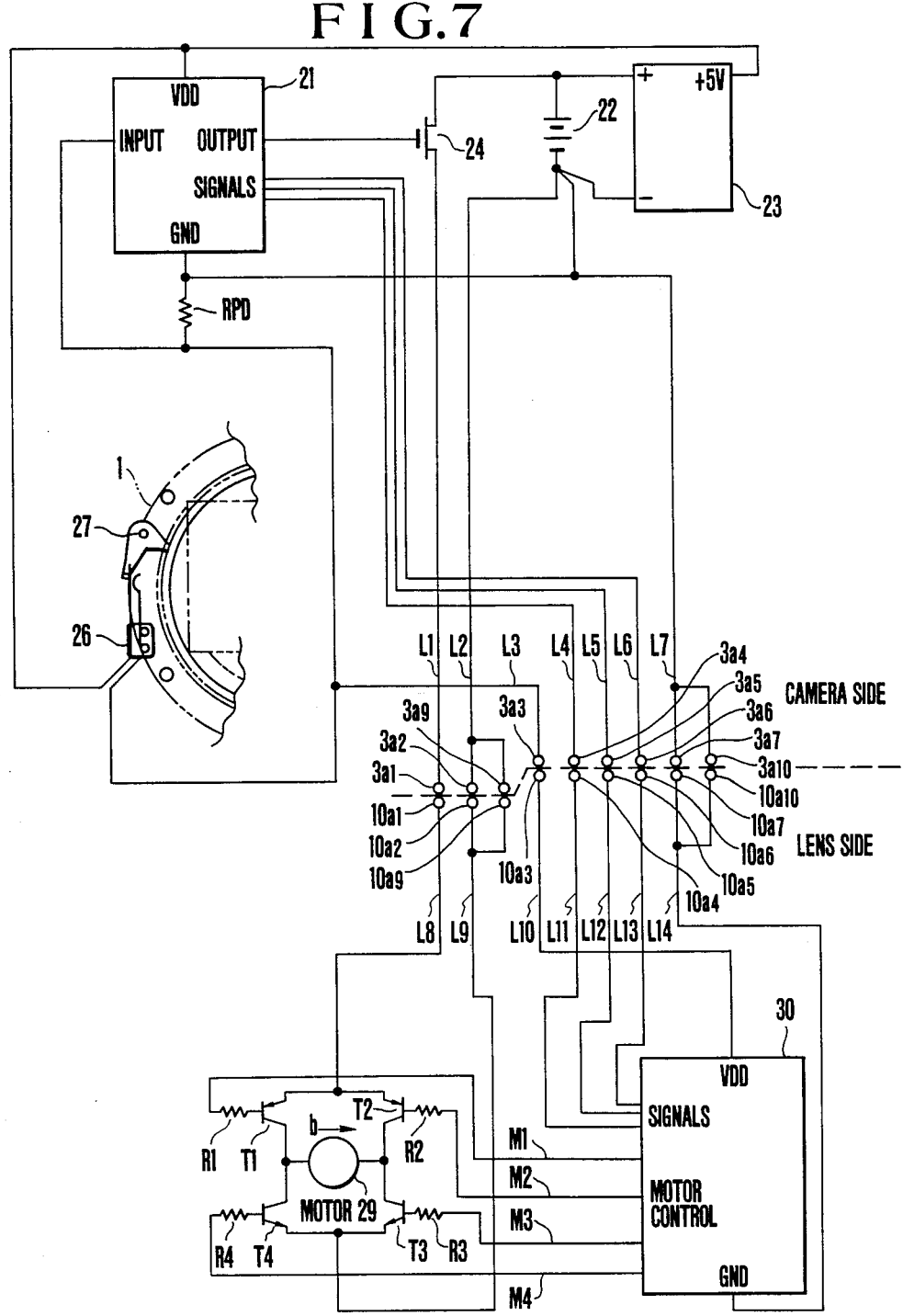
Figure 8:
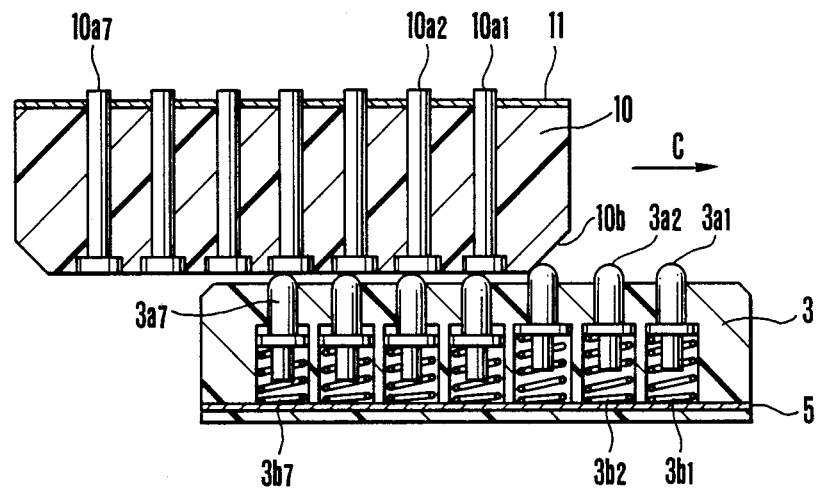
FIGS. 8 to 11 show an example of the conventional connector.
Figure 9:
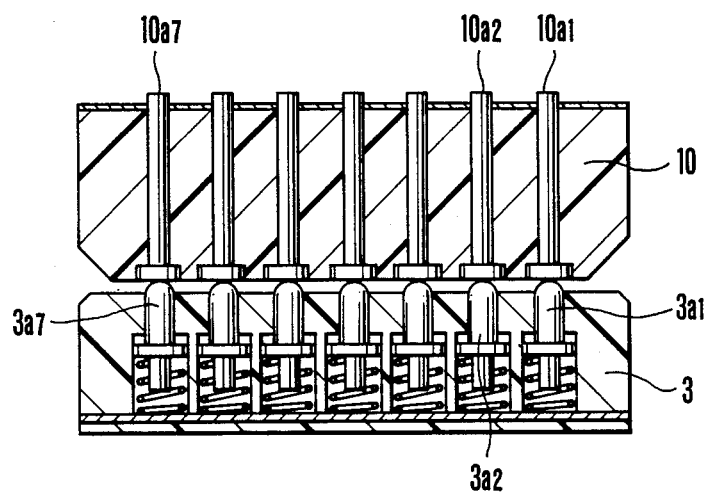
Figure 10:
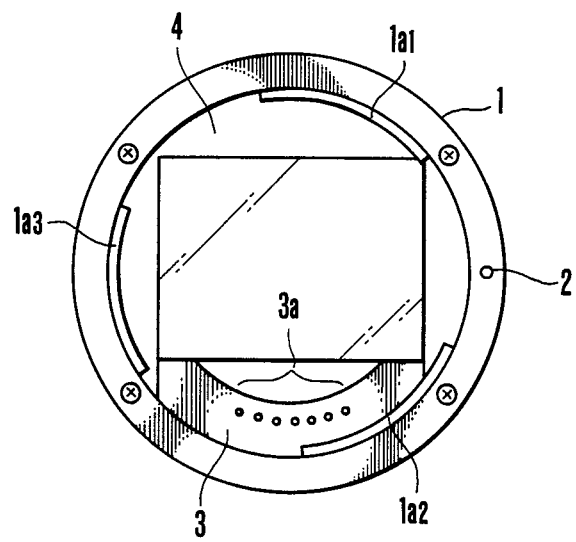
Figure 11:
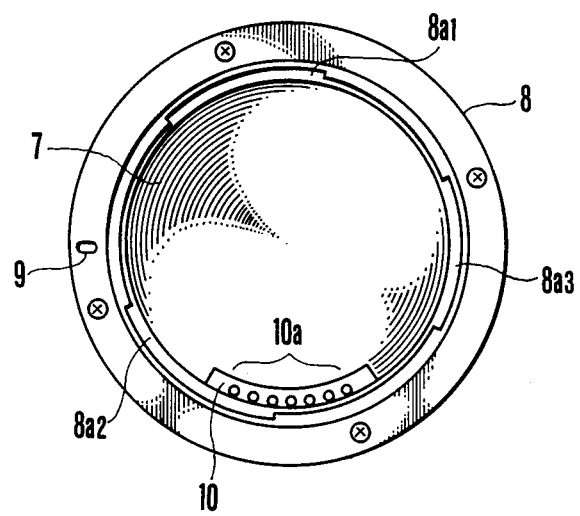
Figure 12:
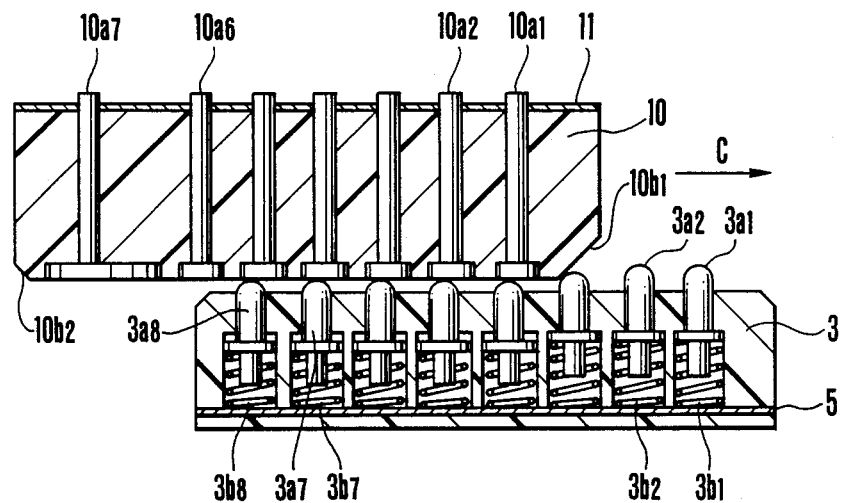
FIGS. 12 to 16 show a connector arranged as a third embodiment of this invention.

FIGS. 5 to 7 show a second embodiment of this invention. The second embodiment is an improvement over the first embodiment in respect to an arrangement for preventing the sliding contact pins from wearing away. In FIGS. 5 to 7, the components of the second embodiment which are the same as those of the first embodiment are shown by the same reference numerals and symbols and the details are omitted from further description. Referring to FIGS. 5 and 6, the contact seat 3 on the side of the camera body has a stepped surface consisting of a first face 3c and a second face 3c'. The contact seat 10 on the side of the interchangeable lens also has a stepped surface which consists of first and second faces 10c and 10c'. The degree of recess of the second face 3c' of the contact seat 3 from the first face 3c approximately coincides with the of degree protrusion of the second face 10c' of the contact seat 10 from the first face 10c.

On the side of the camera body, the two contact pins 3a1 and 3a2 are arranged on the first face 3c of the contact seat 3 while other contact pins 3a3 to 3a7 are arranged on the second face 3c'. Two contact pins 10a1 and 10a2 of the lens which correspond to the above stated contact pins 3a1 and 3a2 are arranged on the first face 10c of the contact seat 10 of the lens. Other contact pins 10a3 to 10a7 of the lens are arranged on the second face 10c' of the contact seat 10. The contact pins 3a1 to 3a7 of the camera body are urged to move in the optical axis direction and are normally kept in their protrudent positions in the same manner as in the case of the first embodiment. They are of course retractable by a pushing force. Meanwhile, the contact pins 10a1 to 10a7 on the lens side are fixedly arranged. The normally protruding extent of the contact pins 3a1 to 3a7 is arranged to be such that: In mounting the interchangeable lens on the camera body by rotating the lens relative to the camera body as shown in FIG. 5, the tips of the contact pins 3a to 3a7 on the camera body side are not contacting the contact pins 10a1 and 102 arranged on the first face 10c of the contact seat 10 of the lens.

Meanwhile, a contact pin 3a9 which has a cleaning function is also disposed on the first face 3c of the contact seat 3 of the camera body. Another cleaning contact pin 3a10 is disposed on the second face 3c'. The cleaning contact pin 3a9 is in the same diametral position as the contact pins 3a1 and 3a2 of the camera body and is in a circumferential position to first slide on the contact pin 10a1 of the lens. The pin 3a9 is being urged by the force of a spring member 3b9 to retractably protrude in the optical axis direction. The other cleaning contact pin 3a10 is in the same diametral position as the contact pins 3a3 to 3a7 of the camera body and is in a circumferential position to first slide on the contact pins 10a3 to 10a7 of the lens during the process of mounting the lens on the camera body by rotating the lens. A spring member 3b10 also urges the pin 3a10 to retractably protrude in the optical axis direction. The normal protruding extent of the above stated cleaning contact pin 3a9 is arranged to be about the same as that of the contact pins 3a1 and 3a2 of the camera body. The normal protruding extent of the other cleaning contact pin 3a10 is arranged to be about the same the other contact pins 3a3 to 3a7 of the camera body. Further, on the side of the lens, the contact seat 10 has a contact pin 10a9 arranged on its first face 10c and another contact pin 10a10 arranged on the second face 10c' in such a way as to abut on the contact pins 3a9 and 3a10 respectively when the lens is completely mounted on the camera body as shown in FIG. 6.

Referring to FIG. 7, the contact pin 3a9 of the camera body is parallel connected to a wiring line L2 which is connected to the contact pin 3a2, and the contact pin 3a10 is connected to a line L7 which is connected to the contact pin 3a7. The contact pin 10a9 on the lens side is parallel connected to a line L9 which is connected to the contact pin 10a2 and the contact pin 10a10 is connected to a line L14 which is connected to the contact pin 10a7.

The second embodiment which is arranged as described above operates as follows: During the process of mounting the lens on the camera body by rotating them relative to each other, the contact pin 3a9 slides on the two contact pins 10a1 and 10a2 disposed on the first face 10c of the contact seat 10 on the lens side. The pin 3a9 thus cleans the contacting surfaces of these pins 10a1 and 10a2 by removing any foreign matter such as dust from them, in the same manner as in the case of the first embodiment, so that inadequate contact can be reliably prevented. Meanwhile, the contact pin 3a10 slides on the other five contact pins 10a3 to 10a7 located on the second face 10c' of the contact seat 10 to likewise clean their surfaces for preventing inadequate contact.

In the case of the second embodiment, the confronting surfaces of the contact seats 3 and 10 are arranged stepped shapes. In mounting and dismounting the interchangeable lens on and from the camera body by rotating them relative to each other, the stepped surfaces lessen the wearing degree of the contact points by reducing the number of times of sliding contact between the two groups of contact pins 3a1 to 3a7 and 10a1 to 10a7. In the case of the first embodiment described in the foregoing, the contact pin 10a1 on the side of the lens, for example, is arranged to slide over the seven contact pins 3a1 to 3a7 and the cleaning contact pin 3a8 in mounting the lens on the camera body by rotating the lens therearound. Whereas, the second embodiment is arranged to have the same contact pin 10a1 slide over only three contact pins 3a1, 3a2 and 3a9. Other contact pins are likewise arranged to slide on a less number of pins to ensure a less degree of abrasion or wear.

While the contact pins on the side of the camera body are arranged to be movable in the embodiments described, the same advantageous effect of this invention is likewise attainable by changing this to make the contact pins on the side of the lens movable.

The first and second embodiments of this invention described in the foregoing are characterized in that: In obtaining electrical connection between a camera accessory such as an interchangeable lens and the camera body with the former mounted on the latter by rotating the former relative to the latter, the contact pin performing a cleaning function is arranged to first come into contact with the confronting group of contact pins. The cleaning contact pin is electrically connected in parallel with other contact pins. Besides, the contact pins arranged on the corresponding side are also electrically connected in parallel to each other. The arrangement enhances the reliability of interconnection of the contact pins and prevents the connector from malfunctioning due to inadequate electrical contact.

Further, the second embodiment is capable of reducing the degree of abrasion or wear of the contact pins by arranging in a stepped shape the confronting surfaces of the contact seats which carry the two confronting groups of contact pins.

Figure 16:
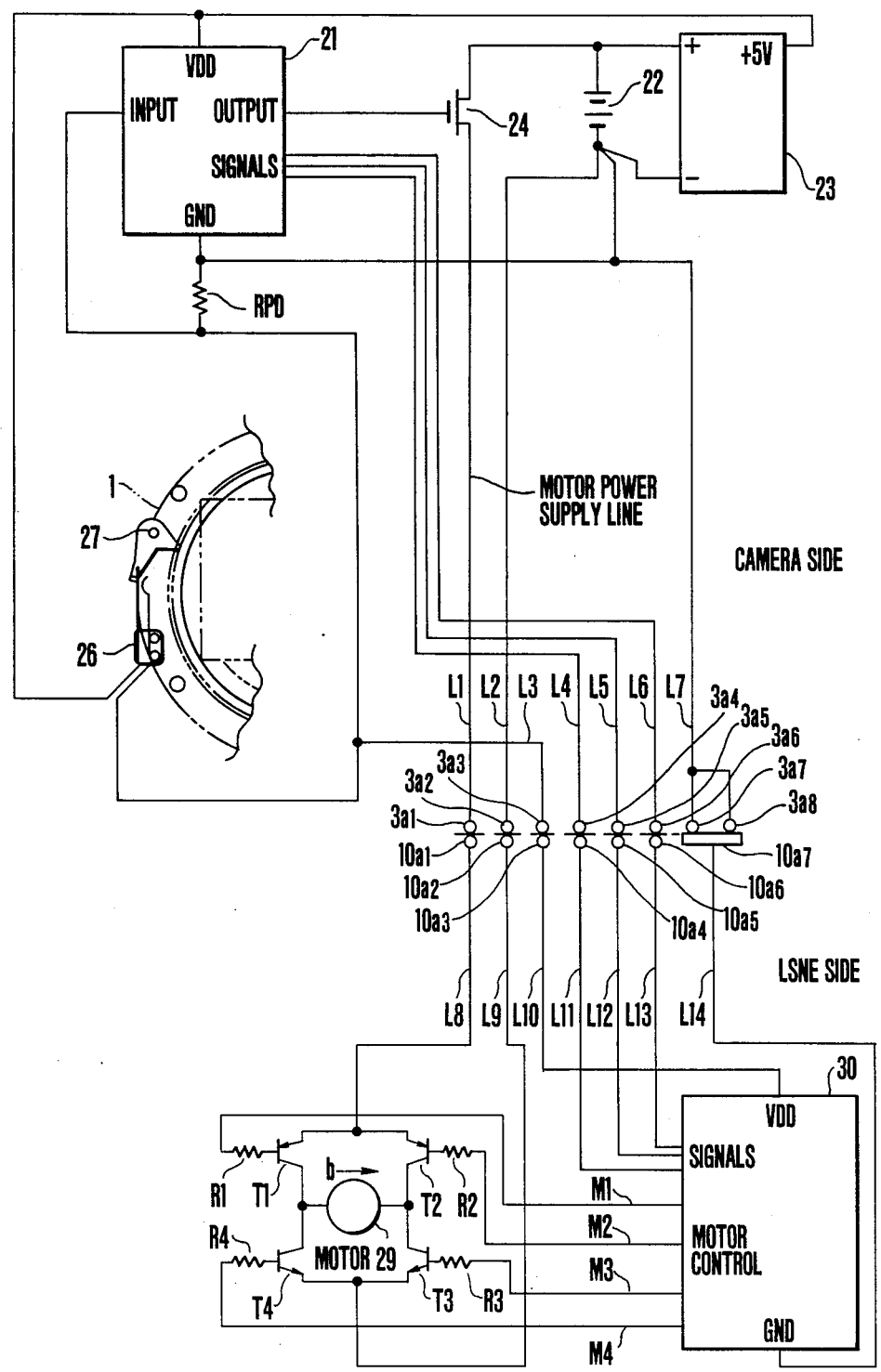
Figure 17:
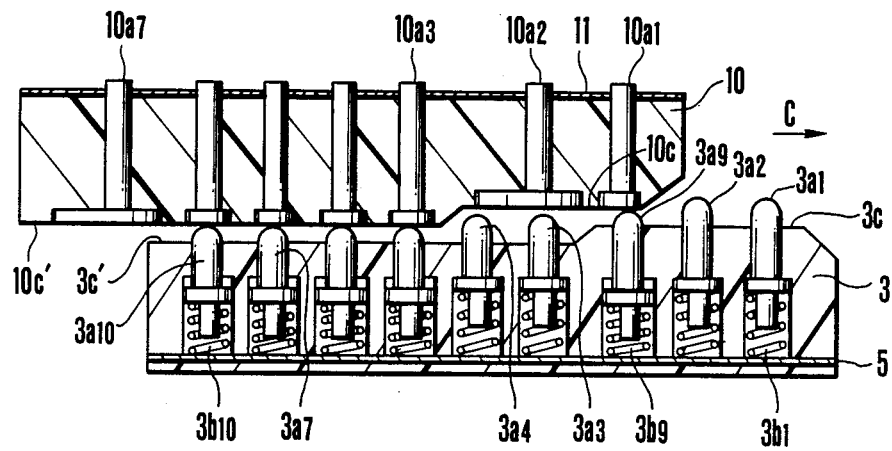
FIGS. 17 to 21 show a connector arranged as a fourth embodiment of the invention.
Figure 18:
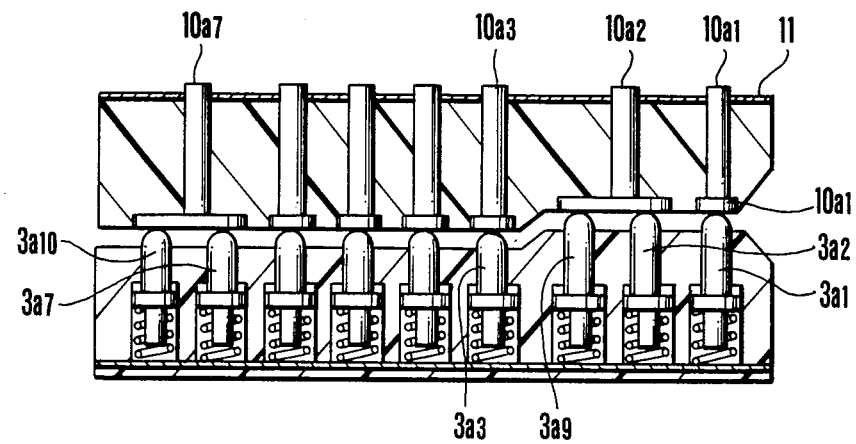
Figure 19:
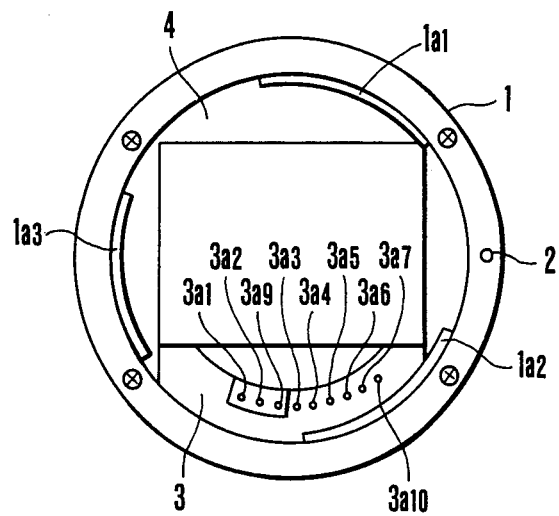
Figure 20:
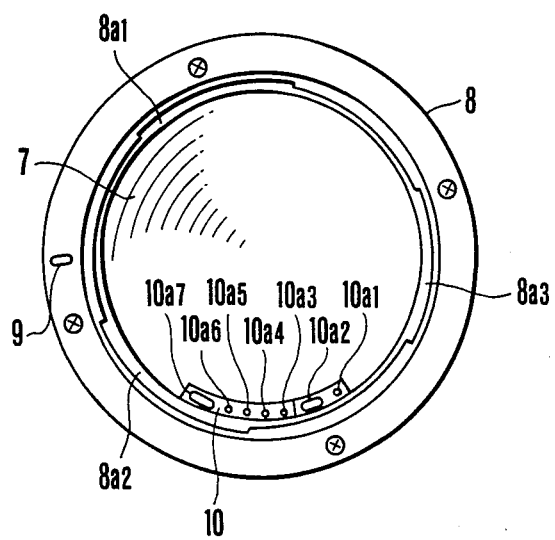
Figure 21:
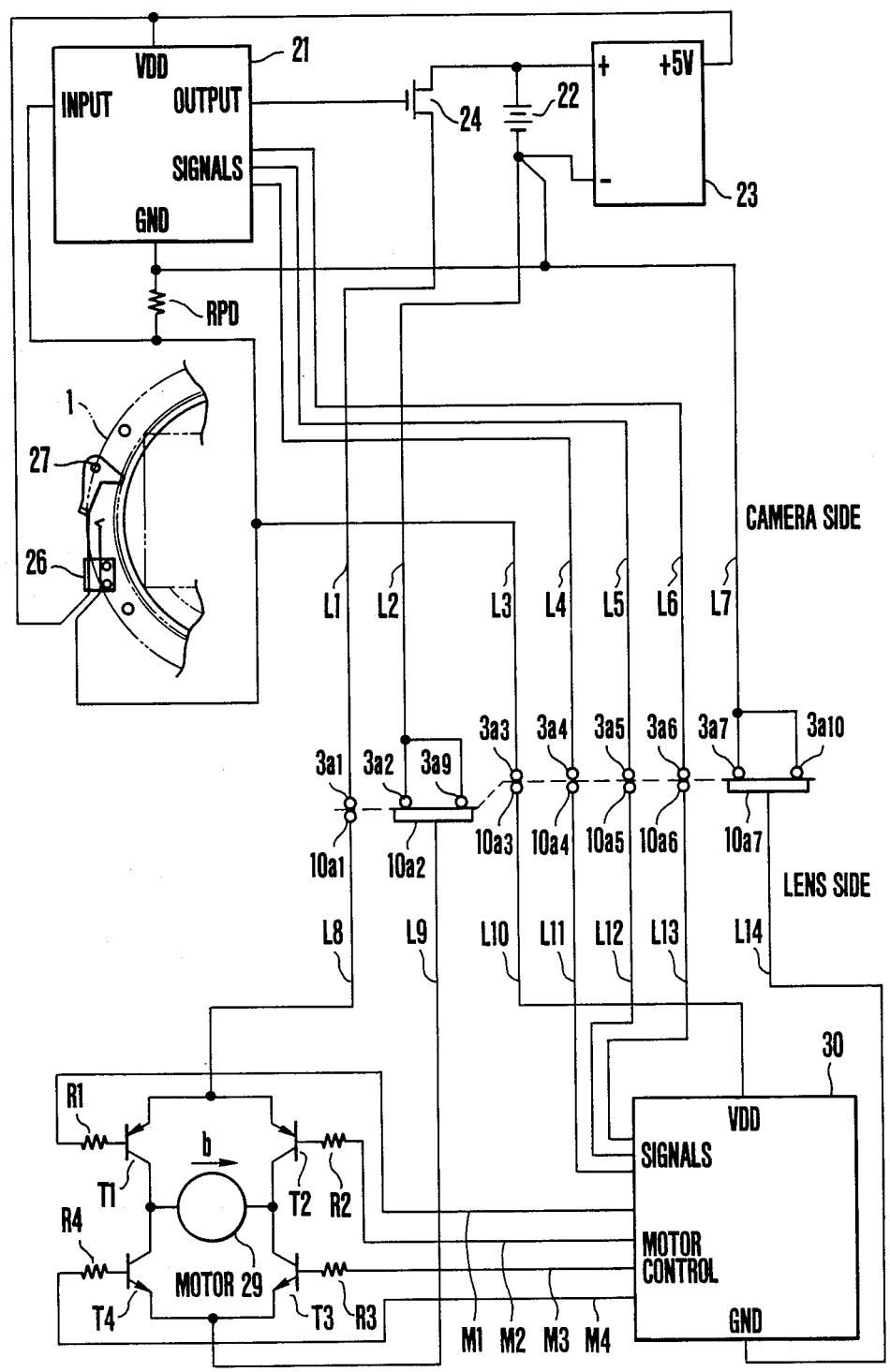

A third embodiment of this invention is described with reference to FIGS. 12 to 16 as follows: The same components and parts as those of the first embodiment are indicated by the same reference numerals and symbols and the details are omitted from further description. In the third embodiment, the contact seat 10 which is disposed along the inner circumference of the bayonet mount 8 of the interchangeable lens is provided with contact pins 10a1 to 10a6. These pins 10a1 to 10a6 are equally spaced and fixedly arranged in the circumferential direction of the mount 8. Another contact pin 10a7 is also fixed to the seat 10 and disposed on the same circumference as the seat and away from the group of these pins at a longer distance than the spacing pitch of the pin group. The contact pin 10a7 is provided with a larger contact part or area than the contact parts of other contact pins 10a1 to 10a6 for the purpose of ensuring that this larger contact part is in contact with both the contact pins 3a7 and 3a8 of the camera body when the lens is completely mounted on the camera body. Further, the pin 3a7 and another pin 3a8 of the camera body are electrically interconnected as shown in FIG. 16, like in the case of the first embodiment. This will be further described later.

Figure 13:
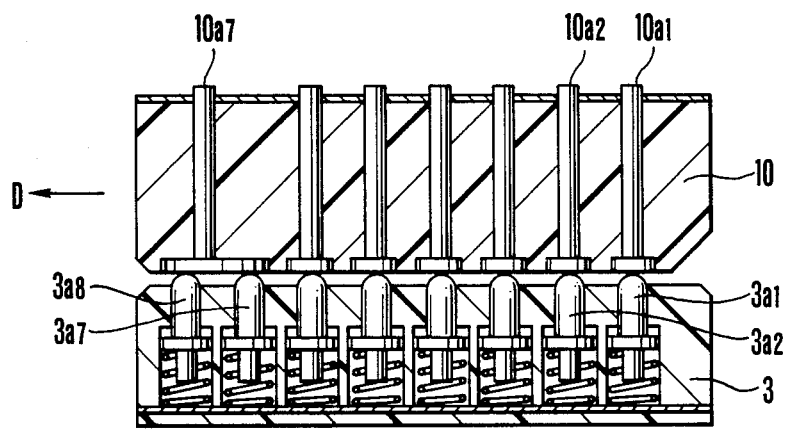
Figure 14:
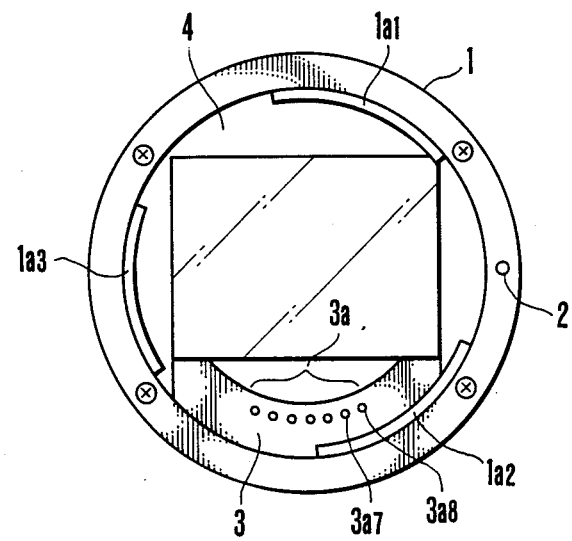
Figure 15:
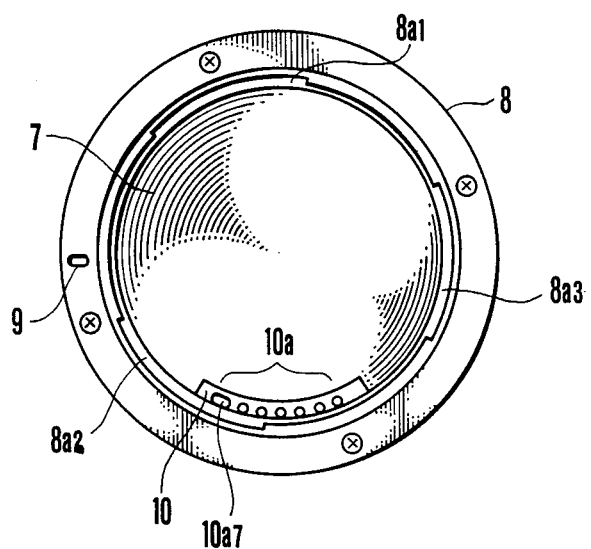

With the third embodiment arranged in the above stated manner, the contact pin 3a8 slides over all the contact pins 10a1 to 10a7 disposed on the side of the lens in mounting the interchangeable lens on the camera body. The contact pin 3a8 eventually reaches a position close to the end of the large contact part of the contact pin 10a7 when the lens is completely mounted on the camera body as shown in FIG. 13. Therefore, any foreign matter such as dust that sticks to the contact faces of the contact pins 10a1 to 10a7 of the lens can be removed by the sliding and cleaning action of the pin 3a8 which is performed like a wiper. The contact pin 10a7 which is located in the farthest end of the group of contact pins and has been hardly cleanable by the conventional arrangement also can be almost completely cleaned by the arrangement of the third embodiment. Therefore, the embodiment ensures adequate electrical contact between the group of pins 3a1 to 3a8 of the camera body and the group of pins 10a1 to 10a7 of the lens.

When the bayonet mount 8 of the lens is completely mounted on the bayonet mount 1 of the camera body, there obtains a condition as shown in FIG. 13 with all the foreign matter such as dust having been completely removed by the contact pin 3a8 of the camera body from the contact faces of the contact pins 10a1 to 10a7 of the lens. Under that condition, the group of contact pins 10a1 to 10a7 of the lens and the group of contact pins 3a1 to 3a7 of the camera body are opposed to and in contact with each other. The possibility of malfunction due to inadequate contact can be greatly lessened by the removal of dust, etc. from between the contact points.

While the contact pins 3a7 and 3a8 are electrically interconnected as mentioned above, the contact pin 10a7 of the lens is arranged to be in contact with both of them as shown in FIG. 13. This arrangement further lessens the probability of inadequate contact.

Referring to FIG. 16, a wiring line L14 which is connected to the ground terminal of the electronic circuit 30 on the lens side is arranged to be connected to the line L7 of the camera body via the contact pins 10a7 and 3a7. The line L14 of the lens is thus arranged to form a single ground line of the interchangeable lens in conjunction with the line L7 of the camera body. The operations of the component parts shown in these drawings are as briefly described below:

(i) When the lens is not mounted on the camera body:

With the lens not mounted on the camera body, the contact seat 10 disposed on the side of the lens is away from the contact seat 3 which is on the side of the camera body. Therefore, the group of contact pins 3a1 to 3a7 and another group of contact pins 10a1 to 10a are not in contact with each other. The lens mounting detection switch 26 which is disposed at the bayonet mount 1 on the side of the camera body has its two switch pieces in a parted state as shown in FIG. 16. Therefore, the input terminal of the electronic circuit 21 is in connection with the negative plate of the power source 22 via the reducing resistor RPD and is in a state of having a low level voltage close to the ground voltage applied thereto. As a result, the output terminal of the circuit 21 is producing a high level voltage to turn off (open) the analog switch 24. The switch 24 is thus disconnecting the contact pin 3a1 from the power source 22.

(ii) When the lens is mounted on the camera body:

In mounting the lens on the camera body, the bayonet mount 8 on the side of the lens is rotated clockwise as viewed on the drawing against the bayonet mount 1 on the side of the camera body. The lens mounting responsive member 27 is caused by the mount 8 to rotate counterclockwise on its pivotal point. As a result, one of the arm parts of the member 27 pushes one of the switch pieces of the lens mounting detection switch 26 to bring the two switch pieces into contact with each other. The switch 26 thus turns on. Therefore, the 5 V output terminal of the constant voltage producing circuit 23 is connected to the input terminal of the electronic circuit 21 via the switch 26. This causes the output voltage level of the circuit 21 to change from the high level to a low level to turn on the analog switch 24. Therefore, the contact pin 3a1 is connected to the positive plate of the power source 22.

When the lens is completely mounted on the bayonet mount 1 of the camera body, the contact pins 3a1 to 3a7 come into contact with the contact pins 10a1 to 10a7 of the lens as shown in FIG. 13. The wiring lines L1 to L7 arranged on the side of the camera body are then connected to the lines L8 to L14 of the lens via the contact pins 3a1 to 3a7 and 10a1 to 10a7. As a result, the connection is completed as shown in FIG. 16. Although FIG. 16 shows the lens mounting detection switch 26 in an open state, the switch 26 is of course kept closed after the lens is completely mounted.

After completion of lens mounting, the circuit 21 of the camera body sends control signals for necessary camera actions (mainly a focusing action) to the circuit 30 of the lens via the lines L4 to L6 and the lines L11 to L13. At the same time, the circuit 30 of the lens also sends signals relative to the motor 29 via these lines to the circuit 21 on the side of the camera body. For example, assuming that the signal level of the line M1 of the circuit 30 becomes low and, at the same time, the signal level of another line M3 high, the transistors T1 and T3 become conductive to allow a current to flow in the direction of arrow b via the transistor T1 to the motor 29 to cause it to rotate forward. This current then circulates through the transistor T3, the line L9, the contact pins 10a2 and 3a2 and the line L2 and comes to the negative plate of the power source 22.

When a signal for reverse rotation of the motor 29 is sent from the circuit 21 to the circuit 30 via the lines L4 to L6, the circuit 30 produces a low level signal to the line M2 and, at the same time, a high level signal to the line M4. At that time, the signal level of the line M1 is high and that of the line M3 low. As a result, the transistors T2 and T4 become conductive. A current in the direction reverse to the direction of arrow b shown in FIG. 16 flows from the transistor T2 to the motor 29. This current causes the motor to rotate in reverse.

A fourth embodiment of this invention is shown in FIGS. 17 to 21. This embodiment is arranged to prevent the wear and tear of the sliding contact pins. In these drawings, the same components and parts as those of the second embodiment are indicated by the same reference numerals and symbols and the details are omitted from further description. A main difference of the fourth embodiment from other embodiments resides in that: The contact pins 10a2 and 10a7 disposed on the side of the interchangeable lens are arranged to have larger contact parts than those of other contact pins in such a way as to have the pin 10a2 in contact with both the contact pins 3a2 and 3a9 of the camera body and the pin 10a7 in contact with both the contact pins 3a7 and 3a10 after the lens is completely mounted on the camera body.

The fourth embodiment which is arranged as stated above operates in the following manner: When the lens B is rotated for mounting it on the camera A, the contact pin 3a9 slides over two contact pins 10a1 and 10a2 located on the first face 10c of the contact seat 10 of the lens so that any foreign matter such as dust can be removed from the contact faces of these pins and the cleaning effect is attained to prevent malfunction due to inadequate contact in the same manner as in the case of the first embodiment. The contact pin 3a10 is likewise arranged to perform the same cleaning action on other contact pins 10a3 to 10a7 which are located on the second face 10c' of the contact seat 10.

The two contact seats 3 and 10 are arranged to have their confronting faces in stepped shapes in such a way as to lessen the degree of wear and tear of the contact faces of the contact pins by reducing the number of times of sliding contact between the group of pins 3a1 to 3a7 and the other group of pins 10a1 to 10a7 at the time of mounting the lens on the camera body. In the case of the third embodiment described in the foregoing, in mounting the lens on the camera body by rotating it, the pin 10a1 on the side of the lens, for example, slides over the seven pins 3a1 to 3a7 of the camera body and another pin 3a8 which has the cleaning function. Whereas, in the case of the fourth embodiment, the pin 10a1 is arranged to slide over only three pins 3a1, 3a2 and 3a9. Other pins are likewise arranged to come into sliding contact a less number of times to ensure a less degree of wear.

While the fourth embodiment has the contact pins of the camera body arranged to be movable, the same advantageous effect is likewise attainable by changing this to have the contact pins of the lens, instead of those of the camera body, arranged to be movable.

In obtaining electrical contact between the two groups of contact pins at the time of mounting an accessory such as an interchangeable lens on the camera body, the third and fourth embodiments of this invention effectively prevent a malfunction by enhancing the reliability of the contact between the contact pin groups, as described in the foregoing, in the following manner: Some of the contact pins that are in the position among one group of contact pins to first come into contact with other group of contact pins, are arranged to perform a cleaning action on the pins of the other group to remove any foreign matter such as dust from their contact faces; and, in addition to that, some of the contact pins that are in a position among the other pins of the same group to come into contact with the cleaning contact pin, are arranged to have a larger contact face which is large enough to be in contact with a plurality of pins for increased reliability of contact.

The fourth embodiment in capable of lessening the wear and tear of the contact pins by arranging the confronting surfaces of the two contact seats in stepped shapes in such a way as to have them come into sliding contact a fewer number of times.

Figure 22:
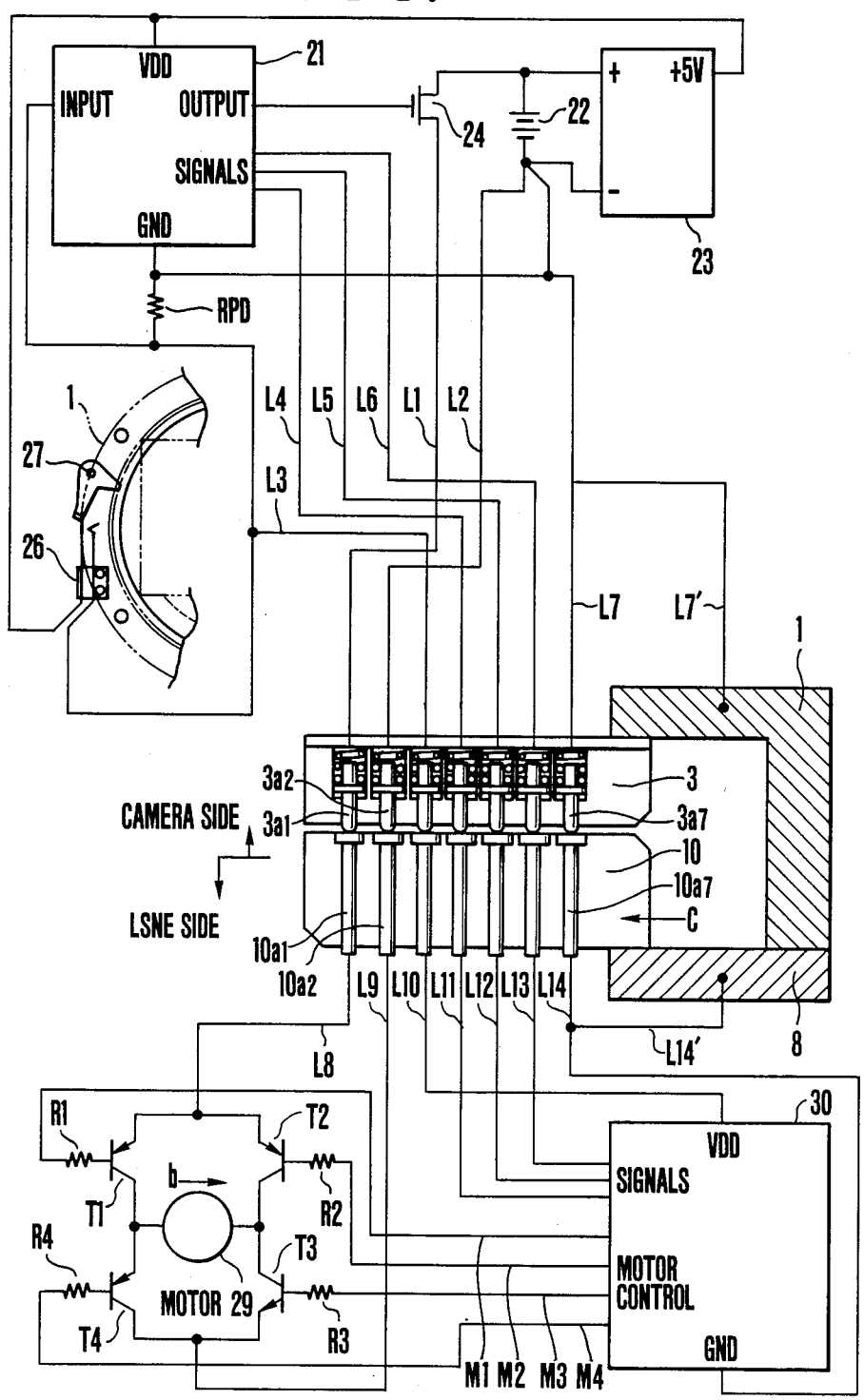
FIGS. 22 to 24 show a connection arranged as a fifth embodiment of the invention.
Figure 23:
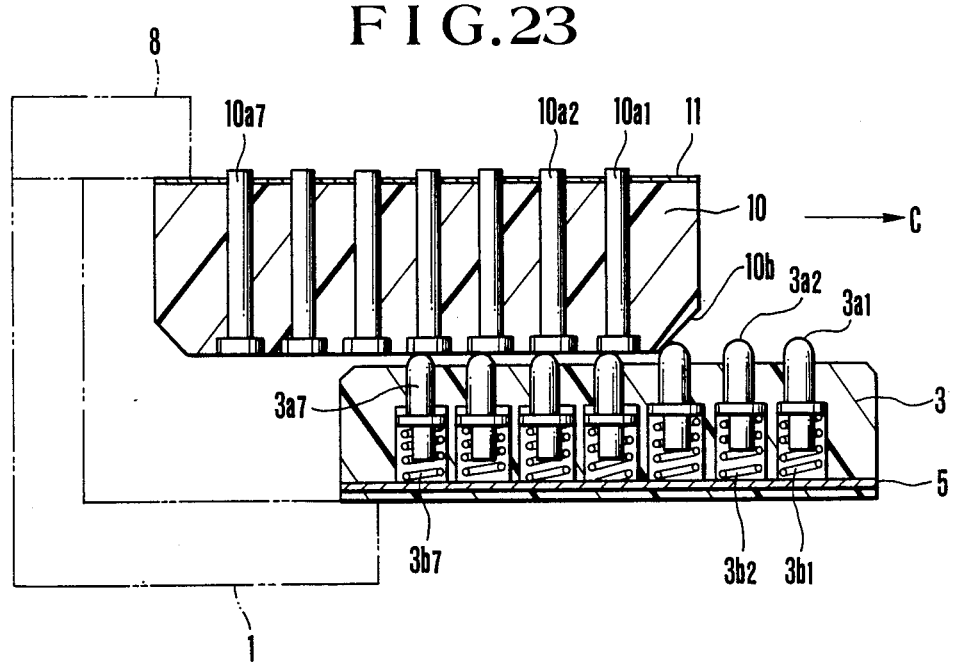
Figure 24:
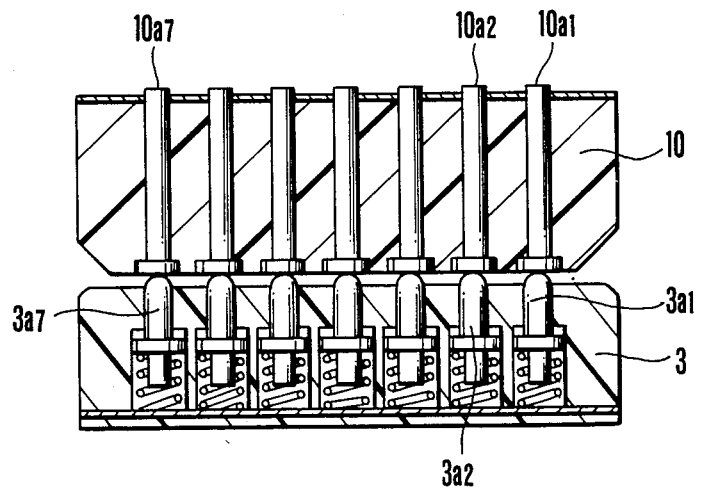

A fifth embodiment of this invention is arranged as shown in FIGS. 22 to 24. In these drawings, components and parts similar to those of the first embodiment are indicated by the same reference numerals and symbols and the details are omitted from further description. The contact seat 3 for wiring connection is disposed in the lower part of the inner circumferential side of the bayonet mount 1 of the camera body. Many contact pins 3a1 to 3a7 are arranged on the contact seat 3 to abut on the contact pins 10a1 to 10a7 which are disposed on the side of the lens. The contact pins 3a1 to 3a7 are connected to wiring lines L1 to L7 arranged on a printed circuit board which is attached to the camera body. A line L7' is connected to the bayonet mount 1 of the camera body in parallel to the line L7. Another line L14' is connected to the bayonet mount 8 disposed on the lens side in parallel to the line L14.

The fifth embodiment which is arranged in this manner operates as briefly described below:

(i) When the lens is not mounted on the camera body:

With the lens not mounted, the contact seat 10 which is on the side of the lens is away from the contact seat 3 of the lens. Therefore, the contact pins 3a1 to 3a7 of the seat 3 and the contact pins 10a1 to 10a7 of the seat 10 are not in contact with each other. The lens mounting detection switch 26 which is disposed at the bayonet mount 1 of the camera body has its two switch pieces in a parted state as shown in FIG. 22. Therefore, the input terminal of the electronic circuit 21 is connected via the reducing resistor RPD to the negative plate of the power source 22. The input terminal is thus under a lower level voltage which is close to the ground voltage. As a result, the output terminal of the circuit 21 is producing a high level voltage which turns off (opens) the analog switch 24. The contact pin 3a1 is thus not connected to the power source 22.

(ii) When the lens is mounted on the camera body:

In mounting the lens on the camera body, the bayonet mount 8 of the lens is rotated clockwise as viewed on the drawing relative to the bayonet mount 1 of the camera body. Therefore, the lens mounting responsive member 27 is caused by the bayonet mount 8 to rotate counterclockwise on its pivotal point. As a result, one of the arm parts pushes one of the switch pieces of the lens mounting detection switch 26. This turns the switch 26 on by bringing the two switch pieces into contact with each other. With the switch 26 thus turned on, the 5 V output terminal of the constant voltage producing circuit 23 is connected via the switch 26 to the input terminal of the circuit 21. A high level (5 V) voltage is thus applied to the input terminal of the circuit 21. As a result, the output voltage level of the circuit 21 changes from the high level to a low level to turn on the analog switch 24. With the switch 24 turned on, the contact pin 3a1 is connected to the positive plate of the power source 22.

When the lens is completely mounted on the bayonet mount 1 of the camera body, the contact pins 10a1 to 10a7 of the lens come into contact with the contact pins 3a1 to 3a7 of the camera body. Therefore, the lines L1 to L7 disposed on the side of the camera body are connected to the lines L8 to L14 of the lens side via the contact pins 3a1 to 3a7 and the contact pins 10a1 to 10a7 respectively. As a result, the wiring connection is completed as shown in FIG. 22. In FIG. 22, the lens mounting detection switch 26 is shown in an open state. However, this switch is kept closed after the lens is completely mounted on the camera body.

After completion of lens mounting, the electronic circuit 21 which is disposed on the side of the camera body sends control signals for camera actions (mainly focusing action) to the electronic circuit 30 on the lens side via the lines L4 to L6 and the lines L11 to L13. At the same time, the circuit 30 on the lens side sends control signals relative to the motor 29 via the same lines to the circuit 21 of the camera body. For example, when a control signal from the circuit 21 causes the signal level of the line M1 of the circuit 30 to become low and, at the same time, causes the signal level of the line M3 of the circuit 30 to become high, the transistors T1 and T3 become conductive. Then, a current flows to the motor 29 in the direction of arrow b as shown in FIG. 22 via the line L8 and the transistor T1. This current circulates through the line L9, the contact pins 10a2 and 3a2 and the line L2 and comes to the negative plate of the power source 22. In case a signal for causing the motor 29 to rotate in reverse is sent from the circuit 21 to the circuit 30 via the lines L4 and L6, the circuit 30 produces a low level signal to the line M2 and, at the same time, a high level signal to the line M4. In this case, the signal level of the line M1 is high and that of the line M3 low. Then, the transistors T2 and T4 become conductive. A current which is in the direction reverse to the direction of arrow b flows from the transistor T2 to the motor 29 to cause the latter to make reverse rotation.

Any foreign matter sticking to the contact pins 10a1 to 10a7 on the side with the lens is removed and their faces are cleaned by the sliding contact with the contact pins 3a7 to 3a1 of the camera body when the lens B is mounted on the camera body A in the same manner as in the case of the conventional arrangement. In this instance, among the contact pins of the lens, the contact pin 10a7 might not be adequately cleaned with the foreign matter remaining on its contact face. Even in that event, however, the bayonet mount 8 of the lens and the bayonet mount 1 of the camera body are pressed into contact with each other, so that there obtains adequate continuity between the contact pins 10a7 and 3a7 when the lens is completely mounted on the camera body. The lines L14 and L7 are thus electrically interconnected via the lines L14' and L7', so that the electronic circuit on the side of the camera body and the electronic circuit on the side of the lens can be reliably connected.

Compared with the contact faces of the contact pins, the contact face of the bayonet mount on the side of the camera body and that of the bayonet mount on the side of the lens are very wide, so that continuity can be reliably obtained by the contact between the two bayonet mounts. Further, since these mounts are arranged to be reliably brought into contact by a known device upon completion of a lens mounting process, this arrangement effectively prevents faulty actions due to inadequate contacts between the contact pieces.

Figure 25:
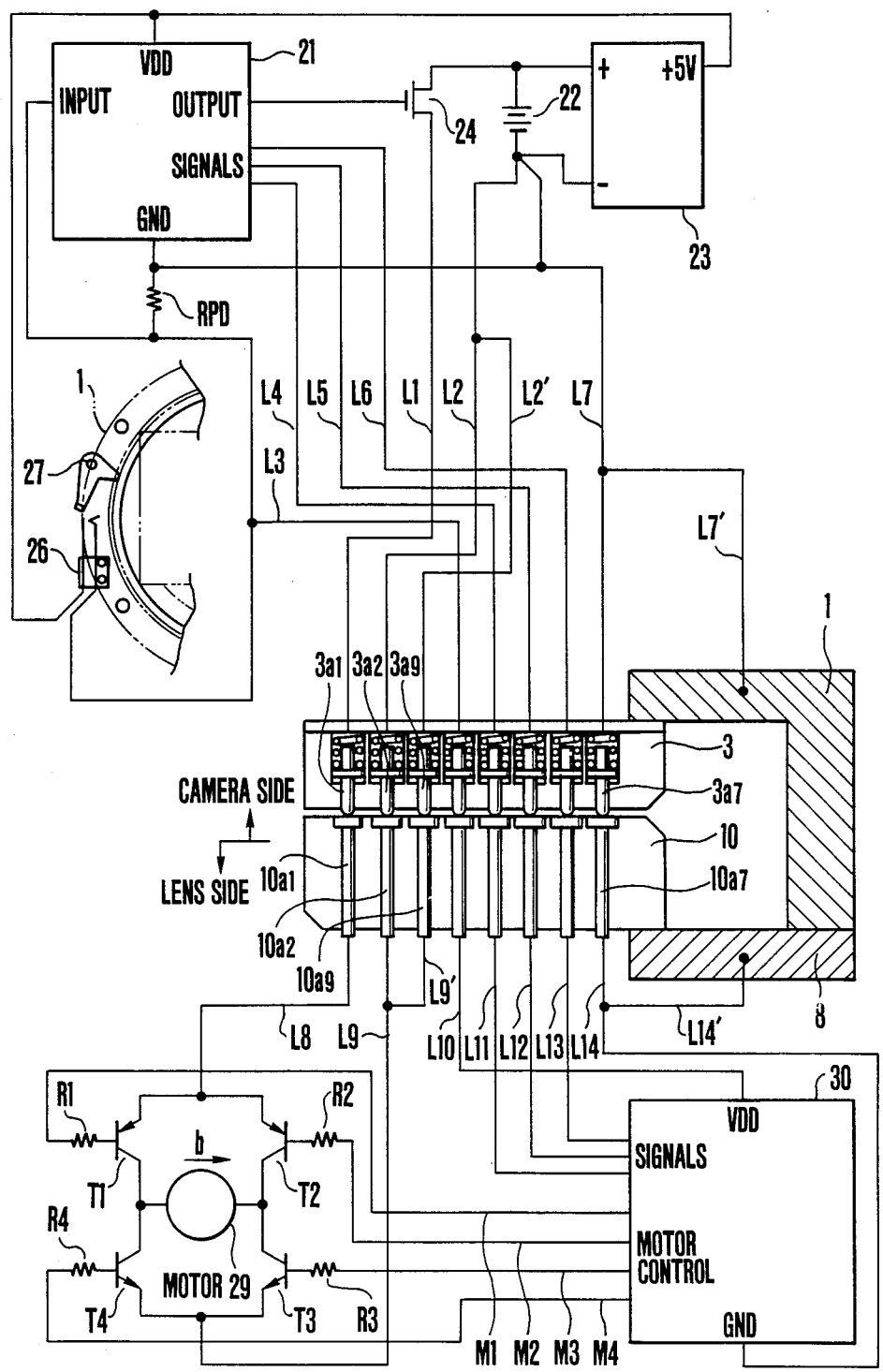
FIGS. 25 to 27 show a connector arranged as a sixth embodiment of the invention.
Figure 26:
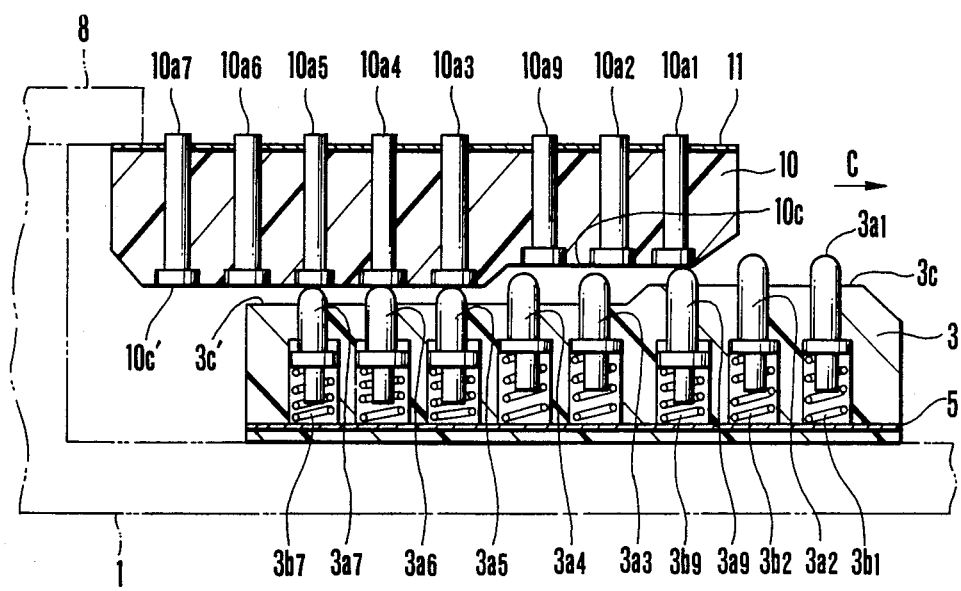
Figure 27:
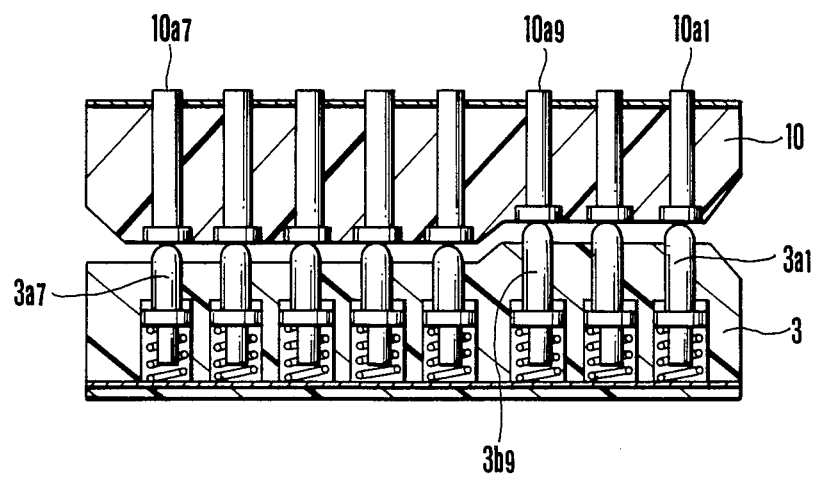

A sixth embodiment of this invention is arranged as shown in FIGS. 25 to 27. The sixth embodiment is intended to prevent the wear and tear of the contact pins. In FIGS. 25 to 27, the same components and parts as those of the second embodiment described in the foregoing are indicated by the same reference numerals and symbols and their details are omitted from the following description:

Referring to FIG. 25, the wiring line L7' which is provided in parallel to the line L7 is connected to the bayonet mount 1 on the side of the camera body. The other line L14' which is provided in parallel to the line L14 is connected to the bayonet mount 8 disposed on the side of the lens. In addition, a line L2' is connected to the contact pin 3a9 in parallel to the line L2 while another line L9' is connected to the contact pin 10a9 in parallel to the line L9.

The sixth embodiment which is arranged in the above stated manner operates as follows: In mounting the interchangeable lens on the camera body by rotating the former relative to the latter, the contact pin 3a9 of the camera body slides over two contact pins 10a1 and 10a2 which are located on the first face 10c of the contact seat 10 to remove any foreign matter such as dust from the contact faces of these pins, so that inadequate contact can be reliably prevented like in the case of the second embodiment. Then, another contact pin 3a7 likewise slides over other contact pins 10a3 to 10a6 located on the second face 10c' of the contact seat 10 of the lens to reliably prevent inadequate contact. While the lens is repeatedly rotated for mounting in this manner, the foreign matter might come to accumulate among the contact pins 10a9 and 10a7 on the lens side to cause inadequate contact between the corresponding contact pins 3a9 and 3a7 of the camera body side. In that event, however, the above stated arrangement to obtain adequate contact between the contact pins 3a3 and 10a2 and between the bayonet mount 1 of the camera body and the bayonet 8 of the lens upon completion of lens mounting ensures adequate electrical connection between the electronic circuit of the camera body and that of the lens.

Further, in the sixth embodiment, the two contact seats 3 and 10 have their confronting surfaces formed in stepped shapes. Their stepped surfaces are arranged such that, in turning round the interchangeable lens for mounting and dismounting on and from the camera body. the contact pins 3a1 to 3a7 and the contact pins 10a1 to 10a7 slide on each other a less number of times. The sixth embodiment, therefore, effectively moderate the degree of wear and tear of the contact pins.

While the sixth embodiment has the contact pins of the camera body arranged to be movable, this arrangement may be changed to have the contact pins of the lens arranged to be movable, instead of the pins of the camera body, for attaining the same advantageous effect.

The fifth and sixth embodiments of the invention are arranged to have pins of one contact pin group that first comes among them into contact with the other group of contact pins perform the cleaning function to remove any foreign matter such as dust in attaining electrical contact between contact pins when the lens is rotated to mount it on the camera body. This cleaning contact pin is disposed close to a contact pin which is to be first contacted among the other pin group. In addition to the electrical connection by means of the above stated contact pins, electrical connection is further ensured by means of the two bayonet mounts which have much larger contact areas. Therefore, these embodiments have very high degree of preventative effect against a malfunction due to inadequate contact. Further, the sixth embodiment is arranged to lessen the wear and tear of the contact pins by forming in stepped shapes the confronting surfaces of the two contact seats of the contact pins in such a way as to have these pins slide on each other a fewer number of times.

A seventh embodiment of this invention is arranged as shown in FIGS. 28 to 35. In these drawings, components and parts which are the same as those of the second embodiment are shown by the same reference numerals and symbols and their details are omitted from further description.

Figure 28:
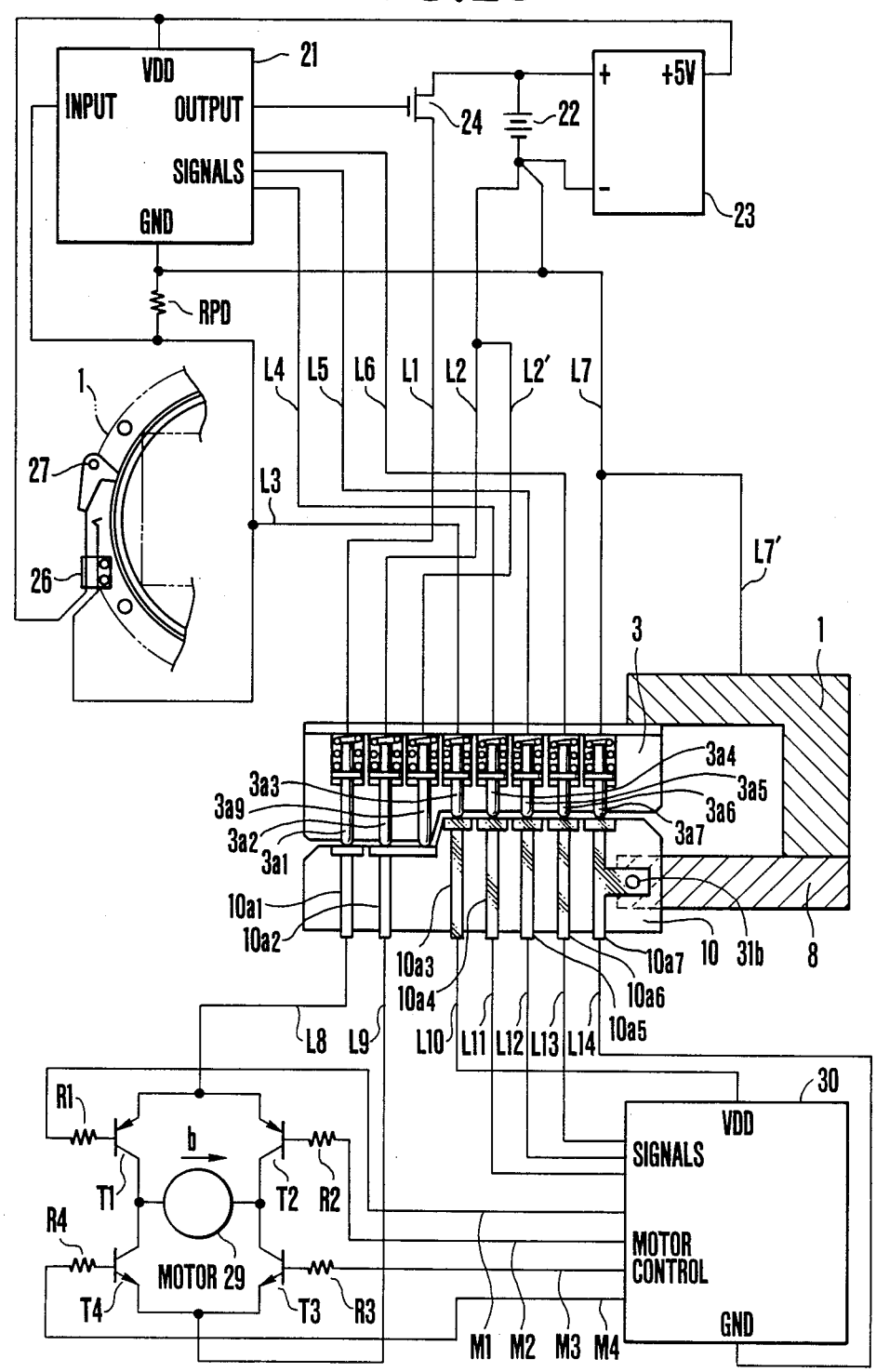
FIG. 28 is a circuit diagram showing the electrical connections made with an accessory (or an interchangeable lens) coupled with a camera body by means of a connector which is arranged as a seventh embodiment of the invention.
Figure 29:
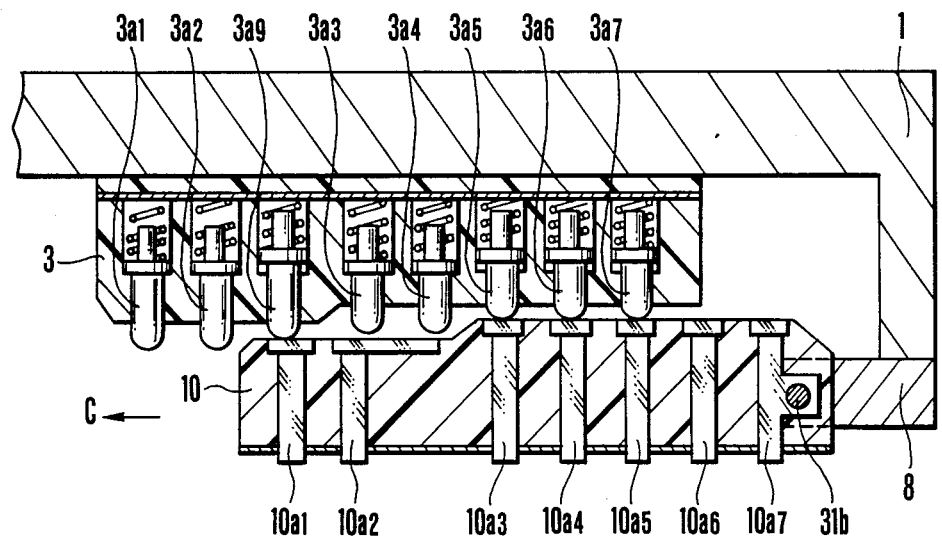

The seventh embodiment is an improvement over the arrangement of the sixth embodiment in respect to the electric connection effected between the bayonet mount 8 of the lens and the contact pin 10a7 by connecting the line L14' to the bayonet mount 8 of the lens and the contact pin 10a7. More specifically, as shown in FIG. 28, a portion of the contact pin 10a7 in the case of the seventh embodiment is extended and is electrically connected to the bayonet mount 8 of the lens via a screw which is used for mounting the contact seat 10 the mount 8. FIGS. 29 and 30 are enlarged views showing the details of the bayonet mount of the camera body and that of the lens in the areas around their connection terminals. The contact pin 10a2 of the lens has a larger contact face than others and is thus arranged to come into contact with both the contact pins 3a2 and 3a9 of the camera body like in the fourth embodiment.

Figure 31:
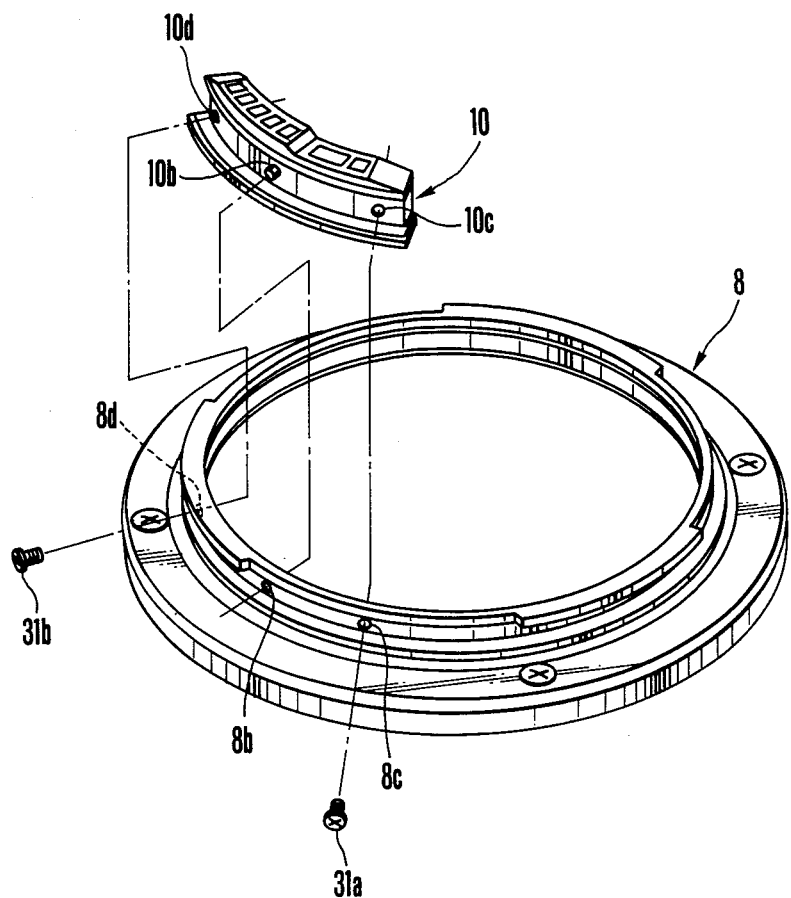
FIGS. 31, 32, 33 and 34 show parts of the accessory located around a lens mount.

FIGS. 31 to 35 are enlarged details showing the bayonet mount 8 in the area around the contact seat 10. Of these drawings, FIG. 31 obliquely shows an arrangement for mounting the contact seat 10 on the bayonet mount 8. Referring to FIG. 31, a positioning pin 10b is erected on the contact seat 10 and protrudes in the radial direction. In mounting the contact seat 10 on the bayonet mount 8 of the lens, the pin 10b is inserted into a positioning hole 8b provided in the bayonet mount 8. At the same time, mounting screws 31a and 31b are screwed via holes provided in the mount 8 into holes 10c and 10d provided in the contact seat 10.

Figure 32:
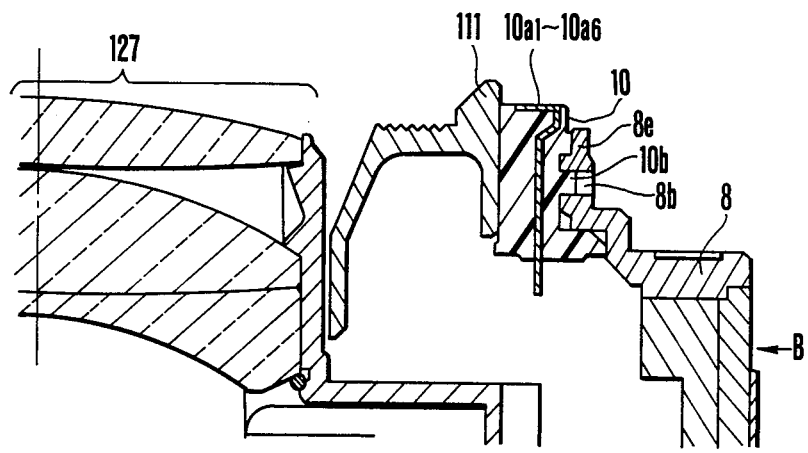

FIG. 32 is a sectional view showing the positioning pin 10b disposed near the bayonet mount 8 of the interchangeable lens. A reference numeral 111 denotes a facial tube. The contact seat 10 is provided with a recess corresponding to a projection 8e of the bayonet mount 8. A numeral 127 denotes a lens group.

Figure 33:
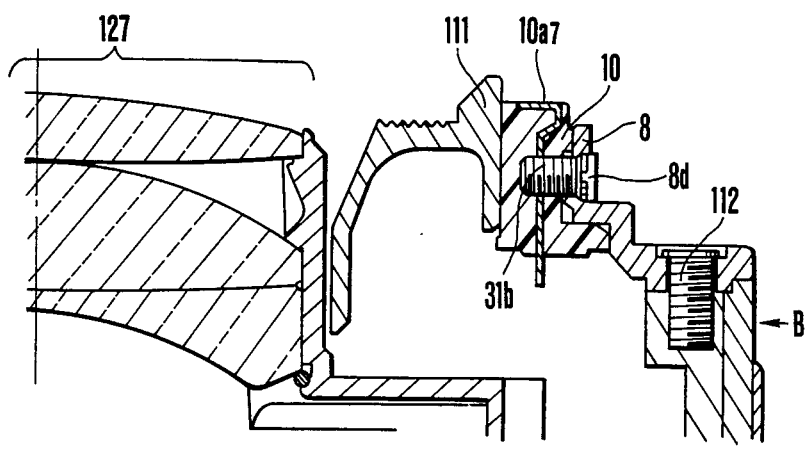
Figure 35:
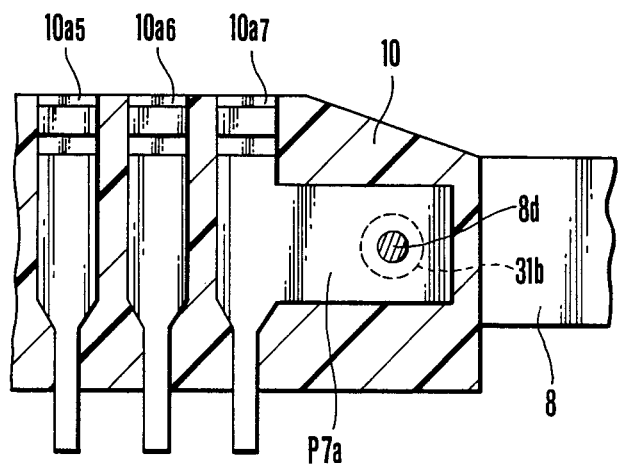
FIG. 35 shows the arrangement of the seventh embodiment made around the contact pins of the accessory.

FIG. 33 is a sectional view showing the mounting screw 31b of the contact seat 10 and parts around the screw. Another mounting screw 112 is used for attaching the bayonet mount 8 to the interchangeable lens B. As shown in FIG. 35, a portion of the contact pin 10a7 extends to form a protruding piece p7a. The contact pin 10a7 is electrically connected via a hole provided in the protruding piece p7a of the bayonet mount 8 of the lens. The protrudent piece p7a also serves to couple the contact seat 10 to the bayonet mount 8. As shown in FIG. 28, while the contact pin 10a7 is thus electrically connected to the bayonet mount 8 of the lens, the pin 10a7 is also electrically connected to the line L7' disposed on the side of the bayonet mount 1 of the camera body.

Figure 34:
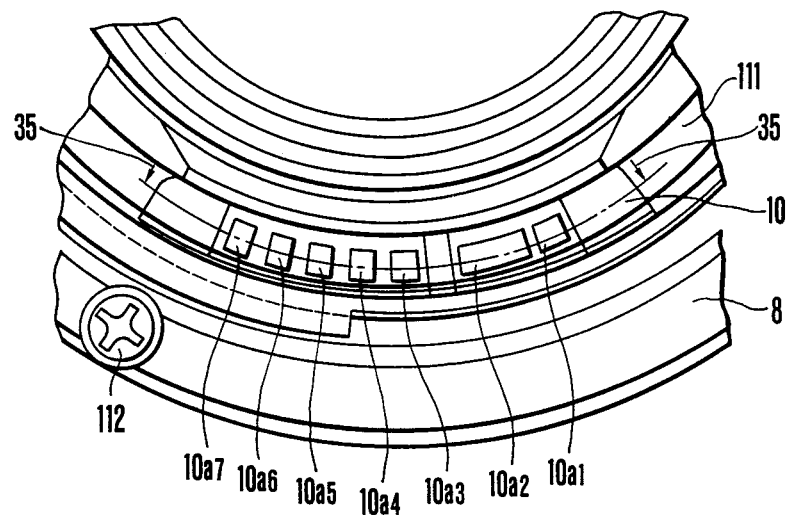

FIG. 34 shows the contact seat 10 and parts arranged around it at the bayonet mount 8 disposed on the side of the lens. FIG. 35 is a sectional view of FIG. 34.

With the arrangement as above stated, the seventh embodiment has the contact pin 10a7 arranged to be electrically connectable to the contact pin 3a7 when the contact seat 10 is attached to the bayonet mount 8 of the lens without adding any wiring member to the wiring line L7' which is connected to the bayonet mount 1 of the camera body.

In mounting the bayonet mount 8 of the lens on the bayonet mount 1 of the camera body by rotation the former, any foreign matter sticking to the contact faces of the contact pins 10a1 to 10a7 is cleaned out by the contact pin 3a7. Then, even if the cleaned out dust or the like accumulates at the contact pin 3a7 to cause inadequate contact between the contact pins 3a7 and 10a7, the above stated arrangement to connect the contact pin 3a7 to the bayonet mount 1 of the camera body by means of the line L7' serves without fail to keep the contact pins 3a7 and 10a7 in connection with each other via the bayonet mount of the camera body, the bayonet mount 8 of the lens and the mounting screw 31b.

It is a feature of the seventh embodiment that, in coupling the bayonet mount 8 of the lens with the bayonet mount 1 of the camera body, the large areas of the contact faces of these bayonet mounts 8 and 1 enable them to be reliably brought into contact with each other. Therefore, in addition to the contact between the contact pins 3a7 and 10a7, the two mounts also come into contact with each other in mounting the lens on the camera body. Therefore, even in the event of inadequate direct contact between these pins 3a7 and 10a7 due to accumulated dust or the like, they can be kept electrically interconnected through the bayonet mounts 8 and 1.

An eighth embodiment of this invention is arranged as shown in FIGS. 36 to 38(b). The following description includes the whole structural arrangement of an interchangeable lens including a contact seat:

The known lens barrels having signal contacts include the following kinds: (i) a kind having electrical signal contacts arranged on a datum plane provided for mounting the lens on the camera body (Japanese Utility Model Application Laid-Open No. SHO 56-126627) and ii) another kind having electrical signal contacts on a rear cover member which is arranged to cover the rear end opening of the lens barrel (Japanese Utility Model Application Laid-Open No. SHO 58-65029). The latter kind having the contacts disposed on the rear cover of the lens barrel has generally been employed. However, the shape of the rear cover of the lens barrel varies with the kind of the lens. Therefore, the electrical signal contacts must be inserted in molding dies one by one. This has resulted in an increase in the cost of dies.

The eighth embodiment solves this problem by separately arranging the contact seat from the rear cover in such a way as to permit the use of the contact seat for varied kinds of lenses in common. The mount contact arrangement of this embodiment thus permits mass production of the contact seat for reduction in cost. Further, in accordance with the arrangement of the embodiment, the cost of the molding dies can be lowered as they can be prepared by simply forming a recess for the contact seat.

Figure 36:
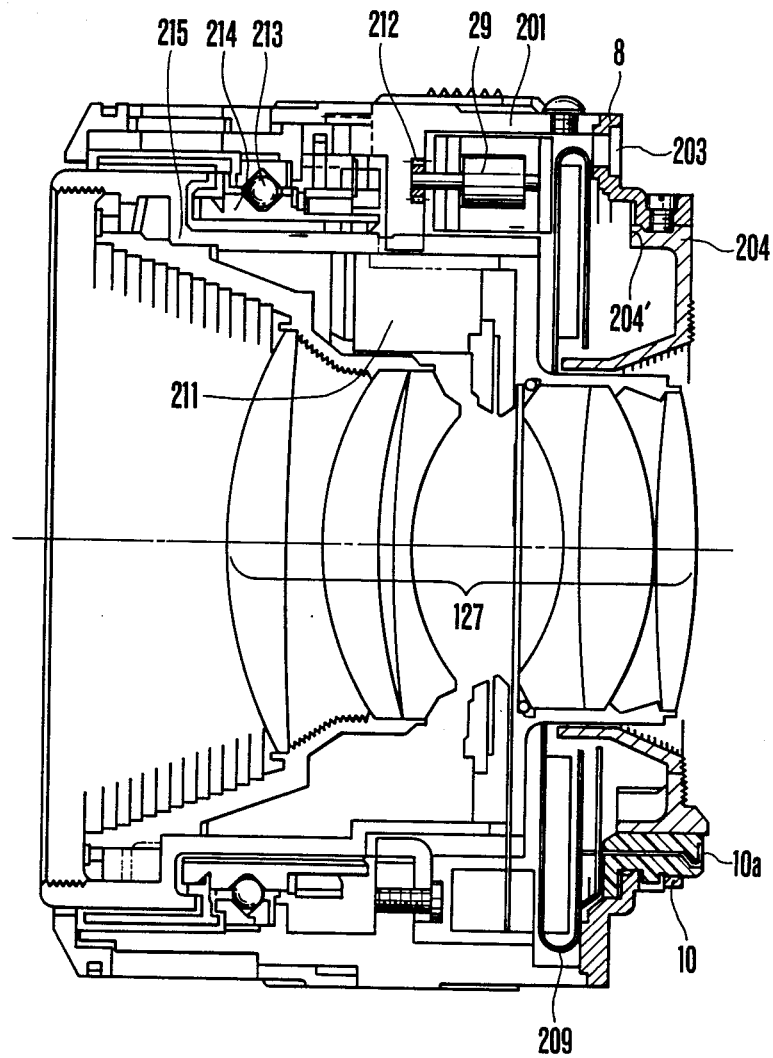
FIG. 36 is a sectional view showing a lens barrel arranged as an eighth embodiment of the invention.

FIG. 36 is a sectional view showing a lens barrel which contains therein an automatic focusing motor and is arranged as the eighth embodiment of this invention. Referring to FIG. 36, the bayonet mount 8 which is provided on the side of the lens for coupling with the camera body is secured by means of screws 203 to the rear end of a fixed lens barrel part 201. A rear cover 204 is arranged to cover the rear end opening of the lens barrel. The rear cover 204 is secured to the bayonet mount 8 of the lens by means of claw parts 204' the above stated contact seat 10 has a plurality of contact pins 10a inserted therein. A flexible printed circuit board 209 is soldered to the contact pins 10a and is arranged to permit electrical signal transmission among the automatic focusing motor 29 included in the lens barrel, an electro-magnetic driven diaphragm unit 211 and a ROM. The motor 29 is provided with an output gear 212. The gear 212 is arranged to drive a rotary helicoid 214 which is rotatably carried by means of a ball race 213 via a reduction gear train which is not shown. The rotation of the helicoid 214 is transmitted to a straight moving helicoid tube 215 which is in screwed engagement with the helicoid 214. This causes the straight moving helicoid tube 215 to move in the optical axis direction to perform a focusing action on a lens group 127 which is being carried by the helicoid tube 215.

When a shutter release button is pushed in by one step with the above stated lens barrel mounted on the camera body, a distance measuring action is performed. Then, a focusing drive control signal is transmitted from the camera body to the automatic focusing motor 29 via the contact pin 10a and the flexible printed circuit board 209. The rotation of the motor 29 is transmitted via the output gear 212 to the reduction gear train. The rotary helicoid 214 is driven by this rotation to move the straight moving helicoid tube 215 in the optical axis direction. A focusing action is thus performed on the lens group 127. When the lens group 127 reaches a given position, a drive stopping signal is produced from the camera body to bring the rotation of the motor 29 to a stop. Then, completion of the focusing action is displayed by light within a view finder. When the shutter release button is pushed further after this display, a diaphragm driving signal is produced from a photometric circuit disposed on the said of the camera body and is transmitted to the electro-magnetic diaphragm unit 211 via the contact pin 10a and the flexible printed circuit board 209 to have the lens aperture stopped down as required. Meanwhile a mirror uplifting action is performed. After than, shutter curtains are allowed to travel for an exposure.

Figure 37:
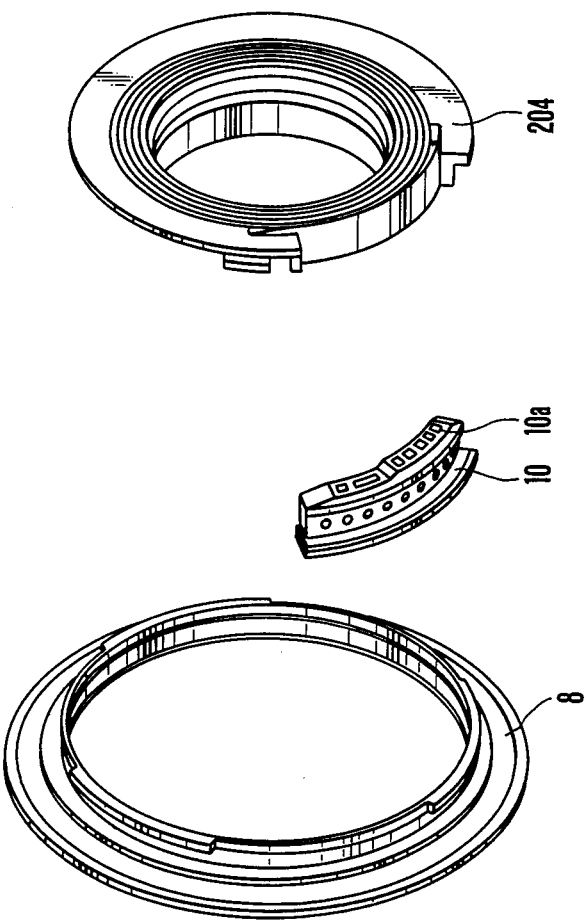
FIG. 37 is an exploded oblique view showing a lens mount and a contact seat in relation to a rear cover.
Figure 38A:
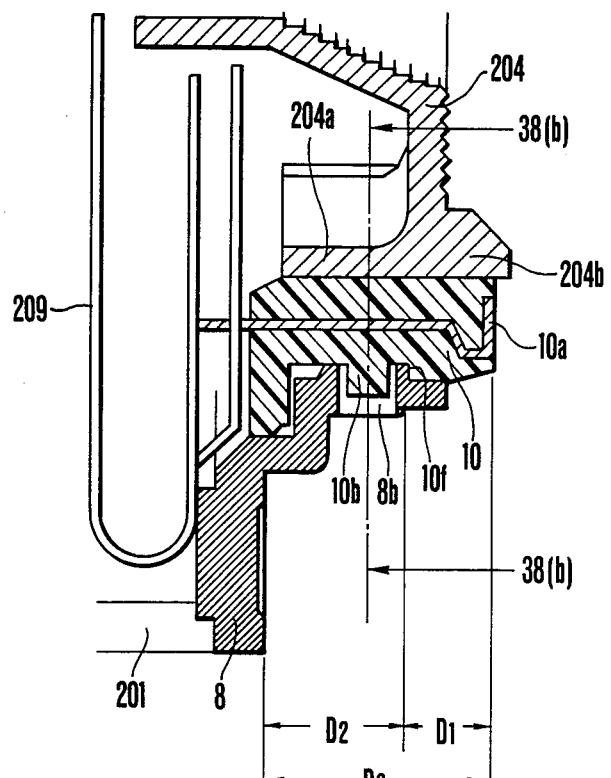
FIG. 38(a) is an enlarged sectional view showing the arrangement of the contact seat.
Figure 38B:
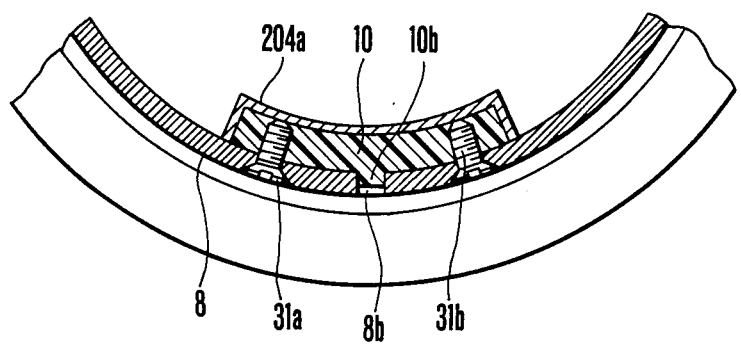
FIG. 38(b) is a sectional view taken along a line A—A of FIG. 38(a).

FIG. 37 shows in an exploded oblique view of the bayonet mount 8 of the lens, the contact seat 10 and the rear cover 204 in relation to each other. FIG. 38(a) is an enlarged view showing the contact seat 10 and parts located round the seat. The contact seat 10 is provided with a positioning stepped part 10f for positioning it relative to the bayonet mount 8 of the lens. A distance D1 between the stepped part 10f and the surface of each of the contact pins is controlled. Also controlled is a distance D2 between the datum mount plane of the bayonet mount 8 of the lens and the positioning stepped part 10f. This dimensional control assures the precision of a distance D3 between each of the contact pins 10a and the datum mount plane in a direction in parallel to the optical axis direction. Meanwhile, the positioning pin 10b of the contact seat 10 which is fitted into the hole 8b of the bayonet mount 8 of the lens as shown in FIG. 38(b) permits the contact seat 10 to be precisely positioned in the circumferential direction round the optical axis. Further, the rear cover 204 is provided with a preventative part 204a which prevents the contact seat 10 from falling inward and a contact guard part 204b which protrudes further than the contact faces of the contact pins 10a and is thus arranged to protect them from being damaged or soiled when the lens is inadvertently left in an upward facing posture.

The eighth embodiment of this invention thus has the contact seat 10 and the rear cover 204 arranged independently of each other to permit the use of the contact seat 10 for interchangeable lenses of different kinds in common. This arrangement not only permits reduction in cost by virtue of mass production but also permits simplification of the dies to be used in molding the rear cover.

What is claimed is:

1. A camera having a bayonet mount on a camera body and on an accessory, said camera body and said accessory being interconnected by rotating said mounts relative to each other and being disconnected by reversely rotating said mounts, a group of contact members being arranged at a camera body connector to be slidingly brought into contact with a group of contact members arranged at an accessory connector by the rotating action of mounting said accessory on said camera body, said group of contact members at said accessory connector being in contact with said group of contact members at said camera body connector to permit communication between said camera body and said accessory upon completion of said mounting action, said camera comprising:

a first conductive member arranged to be electrically connected in parallel with a first contact member among said group of contact members arranged at one of said connectors, said first contact member coming into sliding contact with only one member of said group of contact members arranged at the other of said connectors while said two mounts are rotated relative to each other for mounting said accessory on said camera body; and a second conductive member arranged at said other of said connectors to abut said first conductive member upon completion of said mounting action and to be electrically connected in parallel to a second contact member which is arranged at said other of said connectors and abuts said first contact member upon completion of said mounting action.

2. A camera according to claim 1, wherein said first conductive member is a contact member among the group of contact members arranged at said one of said connectors.

3. A camera according to claim 2, wherein said contact member which is employed as said first conductive member is disposed adjacent to said first contact member.

4. A camera according to claim 1, wherein said first conductive member is a mount on said one of said connectors.

5. A camera according to claim 4, wherein all of said group of contact members arranged at said one of said connectors are arranged on a contact seat; and wherein said first contact member and said mount on one of said connectors are electrically connected in parallel via a conductive mounting screw which is arranged to be used for installing said contact seat in the position of said one of said connectors.

6. A camera according to claim 1, wherein said accessory is an interchangeable lens.

7. A camera according to claim 6, wherein said group of contact members arranged at said camera body connector and said group of contact members arranged at said accessory connector are arranged to abut each other in the direction of an optical axis of said interchangeable lens.

8. A camera according claim 7, wherein said group of contact members arranged at said camera body connector are divided into parts which are in varied positions deviating stepwise in the optical axis direction; and wherein said group of contact members arranged at said accessory connector are likewise divided stepwise, so that said two groups of contact members come into sliding contact with each other a reduced number of times in mounting said interchangeable lens on said camera body by rotating said lens.

9. A camera according to claim 1, wherein said group of contact members arranged at said other of said connectors are of a fixed contact type while said group of contact members arranged at said one of said connectors are of a moving contact type and are urged by resilient members to come into contact with said group of contact members arranged at said other of said connectors.

10. A camera according to claim 9, wherein said first contact member is of a fixed contact type.

11. An Accessory mountable on a camera body which is provided with a bayonet mount and a group of contact members disposed on said camera body, said accessory comprising:

(a) a bayonet mount disposed on said accessory and arranged to be attachable to said bayonet mount on said camera body by rotation in one direction and to be detachable by rotation in another direction;

(b) a group of contact members arranged on said accessory to come into sliding contact with said group of contact members disposed on the camera body while said bayonet mount on said accessory is attached to said bayonet mount on said camera body by rotating said two mounts relative to each other, said group of contact members on said accessory being arranged to be abutting said group of contact members on said camera body when said accessory is completely mounted on said camera body; and (c) a specific contact member which, among said group of contact members on said accessory, is arranged to come into sliding contact with only one of said group of members disposed on said camera body when said two mounts are relatively rotated for mounting, said specific contact member being electrically connected in parallel to a conductive member disposed on said accessory, so that a common signal can be transmitted to or received from said camera body via a plurality of channels formed by said specific contact member and said conductive member.

12. An accessory mountable on a camera body which is provided with a bayonet mount and a group of contact members disposed on said camera body, said accessory comprising:

(a) conductive bayonet mount disposed on said accessory and arranged to be attachable to said bayonet mount on said camera body by rotation in one direction and to be detachable by rotation in another direction;

(b) a group of contact members arranged on said accessory to come into sliding contact with said contact members disposed on said camera body while said bayonet mount on said accessory is attached to said bayonet mount on said camera body by rotating said two mounts relative to each other, said group of contact members on the accessory being arranged to be abutting said group of contact members on said camera body when said accessory is completely mounted on said camera body; and (c) a specific contact member which, among said group of contact members on said accessory, is arranged to come into sliding contact with only one of said group of contact members disposed on said camera body when said two mounts are relatively rotated for mounting, said specific contact member being electrically connected in parallel to said bayonet mount disposed on said accessory, so that a common signal can be transmitted to or received from said camera body via a plurality of channels formed by said specific contact member and said bayonet mount disposed on said accessory.

13. An accessory according to claim 12, wherein said specific contact member and said bayonet mount on said accessory are arranged to communicate with said camera body for a ground signal.

14. An accessory according to claim 12, wherein said accessory is an interchangeable lens.

15. An accessory mountable on a camera body which is provided with a bayonet mount and a group of contact members disposed on said camera body, said accessory comprising:

(a) a bayonet mount disposed on said accessory and arranged to attachable to said bayonet mount on said camera body by rotation in one direction and to be detachable by rotation in another direction;

(b) a group of contact members arranged on said accessory to come into sliding contact with said group of contact members disposed on the camera body while said bayonet mount on said accessory is attached to said bayonet mount on said camera body by rotating said two mounts relative to each other, said group of contact members on said accessory being arranged to be abutting said group of contact members on said camera body when said accessory is completely mounted on said camera body, said group of contact members on said accessory being arranged at a position deviated from said bayonet mount on said accessory so that said group of contact members on said camera body are brought into a non-sliding contact with said bayonet mount on said accessory; and (c) a wide contact member which is included in said group of contact members on said accessory and has a contact area arranged to come into sliding contact with at least two specific adjacent contact members which belong to said group of contact members on said camera body, one member of said at least two specific adjacent contact members being arranged to come into sliding contact the greatest number of times among said member being arranged to permit a signal to be transmitted between said camera body and said accessory via at least two contact members of said camera body.

16. An accessory according to claim 15, wherein said accessory is an interchangeable lens.

17. An accessory mountable on a camera body which is provided with a bayonet mount and a group of contact members disposed on said camera body, said accessory comprising:

(a) a bayonet mount disposed on said accessory and arranged to be attachable to said bayonet mount on said camera body by rotation in one direction and to be detachable by rotation in another direction;

(b) a group of contact members arranged on said accessory to come into sliding contact with said group of contact members disposed on said camera body while said bayonet mount on said accessory is attached to said bayonet mount of said camera body by rotating said two mounts relative to each other, said group of contact members on said accessory being arranged to be abutting said group of contact members on said camera body, when said accessory is completely mounted on said camera body, said group of contact members on said accessory being arranged at a position deviated from said bayonet mount on said accessory so that said group of contact members on said camera body are brought into a non-sliding contact with said bayonet mount on said accessory; and (c) a wide contact member which is in an end position among said group of contact members on said accessory in the direction of mounting rotation of said bayonet mount on said accessory and has a contact area arranged to be wide enough for abutting simultaneously at least two adjacent contact members included in said group of contact members on the camera body, said wide contact member being arranged to permit a signal to be transmitted between said camera body and said accessory via at least two contact members of said camera body.

18. An accessory according to claim 17, wherein said accessory is an interchangeable lens.

19. An accessory mountable on a camera body which is provided with a bayonet mount and a group of contact members disposed on said camera body, said accessory comprising:

(a) a bayonet mount disposed on said accessory and arranged to be attachable to said bayonet mount on said camera body by rotation in one direction and to be detachable by rotation in another direction;

(b) a group of contact members arranged on said accessory to come into sliding contact with said group of contact members disposed on the camera body while said bayonet mount on said accessory is attached to said bayonet mount of said camera body by rotating said two mounts relative to each other, said group of contact members on said accessory being arranged to abutting one said group of contact members on said camera body when said accessory is completely mounted on said camera body; and (c) a specific contact member which, among said group of contact members on said accessory, is arranged to come into sliding contact with only one member of said group of contact members on said camera body when said two mounts are relatively rotated for mounting, and specific contact member being electrically connected in parallel to a another contact member disposed on said accessory, so that a common signal can be transmitted to or received from said camera body via a plurality of channels formed by said specific contact member and said another contact member.

20. An accessory according to claim 19, wherein said accessory is an interchangeable lens.

21. An accessory mountable on a camera body which is provided with a bayonet mount and a first group of contact members and a second group of contact members which is disposed in a position deviating from said first group of contact members in the direction of an optical axis of said accessory, said accessory comprising:

(a) a bayonet mount arranged to be attachable to said bayonet mount on said camera body by rotation in one direction and to be detachable by rotation in another direction;

(b) a first group of contact members arranged to come into sliding contact with said first group of contact members on said camera body, and a second group of contact members arranged to come into sliding contact with said second group of contact members on said camera body while said bayonet mount on said accessory is rotated to be attached to said bayonet mount on said camera body, said first and second groups of contact members on said accessory being disposed in positions deviating from each other in the optical axis direction and being arranged to abut said first and second groups of contact members on said camera body when said accessory is completely mounted on said camera body; and (c) a specific contact member which, among at least one of said first and second groups of contact members on said accessory, is arranged to come into sliding contact with only one contact member of at least one of said first and second groups of contact members disposed on said camera body when said two mounts are relatively rotated for mounting, said specific contact member being electrically connected in parallel to a conductive member disposed on said accessory, so that a common signal can be transmitted to or received from said camera body via a plurality of channels formed by said specific contact member and said conductive member.

22. An accessory according to claim 21, wherein said accessory is an interchangeable lens.

23. An accessory according to claim 21, wherein said first and second groups of contact members on the accessory are arranged at a position deviated from said bayonet mount on said accessory so that said first and second groups of contact members on said camera body are brought into non-sliding contact with said bayonet mount on said accessory.

24. An accessory mountable on a camera body which is provided with a bayonet mount and a first group of contact members and a second group of contact members which is disposed in a position deviating from said first group of contact members in the direction of an optical axis of said accessory, said accessory comprising:
   (a) a conductive bayonet mount arranged to be attachable to said bayonet mount on said camera body by rotation in one direction and to be detachable by rotation in another direction;
   (b) a first group of contact members arranged to come into sliding contact with said first group of contact members on said camera body, and a second group of contact members arranged to come into sliding contact with said second group of contact members on said camera body while said bayonet mount on said accessory is rotated to be attached to said bayonet mount on said camera body, said first and second groups of contact members on said accessory being disposed in positions deviating from each other in the optical axis direction and being arranged to abut said first and second groups of contact members on said camera body when said accessory is completely mounted on said camera body; and
   (c) a specific contact member which, among at least one of said first and second groups of contact members on said accessory, is arranged to come into sliding contact with only one contact member of at least one of said first and second groups of contact members disposed on said camera body when said two mounts are relatively rotated for mounting, said specific contact member being electrically connected in parallel to said bayonet mount disposed on said accessory, so that a common signal can be transmitted to or received from said camera body via a plurality of channels formed by said specific contact member and said bayonet mount on said accessory.

25. An accessory according to claim 24, wherein said accessory is an interchangeable lens.

26. An accessory according to claim 24, wherein said first and second groups of contact members on the accessory are arranged at a position deviated from said bayonet mount on said accessory so that said first and second groups of contact members on said camera body are brought into non-sliding contact with said bayonet mount on said accessory.

27. An accessory according to claim 24, wherein said first and second groups of contact members on said accessory are arranged in one block, said block having a surface in the contact direction arranged at a height almost the same as the contact portion of said contact member.

28. An accessory mountable on a camera body which is provided with a bayonet mount and a first group of contact members and a second group of contact members which is disposed in a position deviating from said first group of contact members in the direction of an optical axis of said accessory, said accessory comprising:
   (a) a bayonet mount arranged to be attachable to said bayonet mount on said camera body by rotation in one direction and to be detachable by rotation in another direction;
   (b) a first group of contact members arranged to come into sliding contact with said first group of contact members on said camera body, and a second group of contact members arranged to come into sliding contact with said second group of contact members on said camera body while said bayonet mount on said accessory is rotated to be attached to said bayonet mount on said camera body, said first and second group of contact members on said accessory being disposed in positions deviating from each other in the optical axis direction and being arranged to abut said first and second groups of contact members on said camera when said accessory is completely mounted on said camera body; and
   (c) a wide contact member which, among at least one of said first and second groups of contact members on said accessory, is arranged to have a contact area wide enough to abut at least two specific adjacent contact members on said camera body, one member of said at least two specific adjacent contact members being arranged to come into sliding contact with one member of said first and second groups of contact members of said accessory the greatest number of times among one of said first and second groups of contact members on said camera body, said wide contact member being arranged to permit a signal to be transmitted between said camera body and said accessory via at least two contact members of said camera body.

29. An accessory to claim 28, wherein said accessory is an interchangeable lens.

30. An accessory according to claim 28, wherein said first and second groups of contact members on the accessory are arranged at a position deviated from said bayonet mount on said accessory so that said first and second groups of contact members on said camera body are brought into non-sliding contact with said bayonet mount on said accessory.

31. An accessory according to claim 28, wherein said first and second groups of contact members on said accessory are arranged in one block, said block having a surface in the contact direction arranged at a height almost the same as the contact portion of said contact member.

32. An accessory mountable on a camera body which is provided with a bayonet mount and a first group of contact members and a second group of contact members which is disposed in a position deviating from said first group of contact members in the direction of an optical axis of said accessory, said accessory comprising:
   (a) a bayonet mount arranged to be attachable to said bayonet mount on said camera body by rotation in one direction and to be detachable by rotation in another direction;

(b) a first group of contact members arranged to come into sliding contact with said first group of contact members on said camera body, and a second group of contact members arranged to come into sliding contact with said second group of contact members on said camera body while said bayonet mount on said accessory is rotated to be attached to said bayonet mount on said camera body, said first and second groups of contact members on said accessory being disposed in positions deviating from each other in the optical axis direction and being arranged to abut said first and second groups of contact members on said camera when said accessory is completely mounted on said camera body; and (c) a wide contact member which is included in at least one of said first and second groups of contact members on said accessory and is in an end position among at least one of said two groups of contact members on said accessory in the direction of mounting rotation of said bayonet mount on said accessory, said wide contact member being arranged to have a contact area wide enough to abut at least two adjacent contact members included in at least one of said two groups of contact members on said camera body, said wide contact member being arranged to permit a signal to be transmitted between said camera body and said accessory via at least two contact members of said camera body.

33. An accessory according to claim 32, wherein said accessory is an interchangeable lens.

34. An accessory according to claim 32, wherein said first and second groups of contact members on the accessory are arranged at a position deviated from said bayonet mount on said accessory so that said first and second groups of contact members on said camera body are brought into non-sliding contact with said bayonet mount on said accessory.

35. An accessory according to claim 32, wherein said first and second groups of contact members on said accessory are arranged in one block, said block having a surface in the contact direction arranged at a height almost the same as the contact portion of said contact member.

36. An accessory mountable on a camera body which is provided with a bayonet mount and a first group of contact members and a second group of contact members which is disposed in a position deviating from said first group of contact members in the direction of an optical axis of said accessory, said accessory comprising:

(a) a bayonet mount arranged to be attachable to said bayonet mount on said camera body by rotation in one direction and to be detachable by rotation in another direction;

(b) a first group of contact members arranged to come into sliding contact with said first group of contact members on said camera body, and a second group of contact members arranged to come into sliding contact with said second group of contact members on said camera body while said bayonet mount on said accessory is rotated to be attached to said bayonet mount on said camera body, said first and second groups of contact members on said accessory being disposed in positions deviating from each other in the optical axis direction and being arranged to abut said first and second groups of contact members on said camera body when said accessory is completely mounted on said camera body; and (c) a specific contact member which, among at least one of said first and second groups of contact members on said accessory, is arranged to come into sliding contact with only one contact member of at least one of said first and second groups of contact members disposed on said camera body when said two mounts are relatively rotated for mounting, said specific contact member being electrically connected in parallel to another contact member belonging to the same group of contact members disposed on said accessory, so that a common signal can be transmitted or received from said camera body via a plurality of channels formed by said specific contact member and said another contact member.

37. An accessory according to claim 22, wherein said first and second groups of contact members on the accessory are arranged in one block; and wherein said block is formed discretely from an outer fitting member of said bayonet mount disposed on the lens; and wherein said block is attached to said outer fitting member.

38. An accessory according to claim 24, wherein said first and second groups of contact members on the accessory are arranged in one block; and wherein said block is formed discretely from an outer fitting member of said bayonet mount disposed on the accessory; and wherein said block is attached to said outer fitting member.

39. An accessory according to claim 28, wherein said first and second groups of contact members on the accessory are arranged in one block; and wherein said block is formed discretely from an outer fitting member of said bayonet mount disposed on the accessory and wherein said block is attached to said outer fitting member.

40. An accessory according to claim 32, wherein said first and second groups of contact members on the accessory are arranged in one block; and wherein said block is formed discretely from an outer fitting member of said bayonet mount disposed on the accessory; and wherein said block is attached to said outer fitting member.

41. An accessory according to claim 36, wherein said first and second groups of contact members on the accessory are arranged in block; and wherein said block is formed discretely from an outer fitting member of said bayonet mount disposed on the accessory; and wherein said block is attached to said outer fitting member.

42. An accessory according to claim 36, wherein said accessory is an interchangeable lens.

43. An accessory according to claim 26, wherein said first and second groups of contact members on the accessory are arranged at a position deviated from said bayonet mount on said accessory so that said first and second groups of contact members on said camera body are brought into non-sliding contact with said bayonet mount on said accessory.

44. An accessory according to claim 36, wherein said first and second groups of contact members on said accessory are arranged in one block, said block having a surface in the contact direction arranged at a height almost the same as the contact portion of said contact member.

45. An accessory mountable on a camera body which is provided with a bayonet mount and a first group of contact members and a second group of contact members which is disposed in a position deviating from said first group of contact members in the direction of an optical axis of said accessory, said accessory comprising:
- (a) a conductive bayonet mount arranged to be attachable to said bayonet mount on said camera body by rotation in one direction and to be detachable by rotation in another direction;
- (b) a first group of contact members arranged to come into sliding contact with said first group of contact members on said camera body, and a second group of contact members arranged to come into sliding contact with said second group of contact members on said camera body while said bayonet mount on said accessory is rotated to be attached to said bayonet mount on said camera body, said first and second groups of contact members on said accessory being disposed in positions deviating from each other in the optical axis direction and being arranged to abut said first and second groups of contact members on said camera body when said accessory is completely mounted on said camera body; and
- (c) a specific contact member arranged, among said first group of contact members on said accessory, to come into sliding contact with only one contact member in said first group of contact members on said camera body and to be electrically connected in parallel to said bayonet mount disposed on said accessory; and
- (d) a wide contact member which is located in said second group of contact members on said accessory and is in an end position among said second group of contact members in the direction of mount rotation of said bayonet mount on said accessory, said wide contact member being arranged to have a contact area wide enough to abut at least two adjacent contact members included in said second group of contact members on said camera body.

46. An accessory according to claim 45, wherein said first and second groups of contact members on the accessory are arranged in one block; and wherein said block is formed discretely from an outer fitting member of said bayonet mount disposed on the accessory; and wherein said block is attached to said outer fitting member.

47. An accessory according to claim 45, wherein said accessory is an interchangeable lens.

48. An accessory according to claim 45, wherein said first and second groups of contact members on the accessory are arranged at a position deviated from said bayonet mount on said accessory so that said first and second groups of contact members on said camera body are brought into non-sliding contact with said bayonet mount on said accessory.

49. An accessory according to claim 45, wherein said first and second groups of contact members on said accessory are arranged in one block, said block having a surface in the contact direction arranged at a height almost the same as the contact portion of said contact member.

* * * * *

UNITED STATES PATENT AND TRADEMARK OFFICE
CERTIFICATE OF CORRECTION

PATENT NO. : 4,853,725

DATED : August 1, 1989

INVENTOR(S) : Matsuda, et al.

It is certified that error appears in the above-identified patent and that said Letters Patent is hereby corrected as shown below:

COLUMN 1:

Line 51, "been" should read --has--.

COLUMN 2:

Line 40, "with" should read --which--.

COLUMN 4:

Line 8, "the" should read --in--.

COLUMN 5:

Line 26, "lens units." should read --lens unit--.

COLUMN 7:

Line 27, "contact pins 10a1 to 10a" should read --contact pins 10a1 to 10a7--;

Line 31, "line 9" should read --line L9--; and

Line 33, "line 9" should read --line L9--.

COLUMN 9:

Line 48, "of degree" should read --degree of--.

UNITED STATES PATENT AND TRADEMARK OFFICE
CERTIFICATE OF CORRECTION

PATENT NO. : 4,853,725

DATED : August 1, 1989

INVENTOR(S) : Matsuda, et al.

It is certified that error appears in the above-identified patent and that said Letters Patent is hereby corrected as shown below:

COLUMN 10:

Line 58, "arranged" should read --arranged in--.

COLUMN 12:

Line 40, "contact pins 10a1 to 10a" should read --contact pins 10a1 to 10a7--.

COLUMN 14:

Line 18, "less number" should read --fewer number--.

COLUMN 15:

Line 63, "transistor T1. This" should read --transistor T1. This causes the motor 29 to rotate forward. This--.

COLUMN 17:

Line 16, "less number" should read --fewer number--;

Line 26, "pins" should read --some pins--; and

Line 61, "the mount 8." should read --to the mount 8.--.

UNITED STATES PATENT AND TRADEMARK OFFICE
CERTIFICATE OF CORRECTION

PATENT NO. : 4,853,725

DATED : August 1, 1989

INVENTOR(S) : Matsuda, et al.

It is certified that error appears in the above-identified patent and that said Letters Patent is hereby corrected as shown below:

COLUMN 18:

Line 45, "rotation" should read --rotating--; and

Line 55, "bayonet mount" should read --bayonet mount 1--.

COLUMN 19:

Line 12, "and ii)" should read --and (ii); and

Line 41, "204' the" should read --204. The--.

COLUMN 20:

Line 9, "said" should read --side--.

COLUMN 21:

Line 61, "Accessory" should read --accessory--.

COLUMN 22:

Line 66, "to attachable" should read --to be attachable--.

UNITED STATES PATENT AND TRADEMARK OFFICE
CERTIFICATE OF CORRECTION

PATENT NO. : 4,853,725

DATED : August 1, 1989

INVENTOR(S) : Matsuda, et al.

It is certified that error appears in the above-identified patent and that said Letters Patent is hereby corrected as shown below:

COLUMN 23:

Line 25, "said member" should read --said group of contact members of said camera body, said wide contact member--.

COLUMN 24:

Line 16, "to abutting one" should read --to be abutting--; and

Line 27, "a" should be deleted.

COLUMN 26:

Line 22, "said first and second group" should read --said first and second groups--.

COLUMN 28:

Line 20, "claim 22," should read --claim 21,--;

Line 24, "lens;" should read --accessory;--;

Line 50, "in block;" should read --in one block--; and

Line 56, "claim 26," should read --claim 36,--.

UNITED STATES PATENT AND TRADEMARK OFFICE
CERTIFICATE OF CORRECTION

PATENT NO. : 4,853,725

DATED : August 1, 1989

INVENTOR(S) : Matsuda, et al.

It is certified that error appears in the above-identified patent and that said Letters Patent is hereby corrected as shown below:

COLUMN 30:

Line 5, "mount rotation" should read --mounting rotation--.

Signed and Sealed this

Seventeenth Day of December, 1991

Attest:

HARRY F. MANBECK, JR.

Attesting Officer

Commissioner of Patents and Trademarks